(12) United States Patent
Furukawa et al.

(10) Patent No.: US 8,479,274 B2
(45) Date of Patent: Jul. 2, 2013

(54) PERSONAL VERIFICATION DEVICE

(75) Inventors: Kenichi Furukawa, Tokyo (JP); Shinji Hirabayashi, Tokyo (JP); Naoki Tatsumi, Tokyo (JP); Minenori Nagasaka, Tokyo (JP); Yoshihiro Sakanushi, Tokyo (JP)

(73) Assignee: Mitsumi Electric Co., Ltd, Tokyo (JP)

( * ) Notice: Subject to any disclaimer, the term of this patent is extended or adjusted under 35 U.S.C. 154(b) by 0 days.

(21) Appl. No.: 13/062,134

(22) PCT Filed: Apr. 23, 2010

(86) PCT No.: PCT/JP2010/002954
§ 371 (c)(1),
(2), (4) Date: Mar. 3, 2011

(87) PCT Pub. No.: WO2010/122807
PCT Pub. Date: Oct. 28, 2010

(65) Prior Publication Data
US 2012/0028710 A1     Feb. 2, 2012

(30) Foreign Application Priority Data

Apr. 24, 2009 (JP) .................................. 2009-106826
Apr. 15, 2010 (JP) .................................. 2010-094135

(51) Int. Cl.
*H04L 29/06* (2006.01)

(52) U.S. Cl.
USPC .......................................................... 726/9

(58) Field of Classification Search
USPC .......................................................... 726/9
See application file for complete search history.

(56) References Cited

U.S. PATENT DOCUMENTS

| 3,872,443 | A | 3/1975 | Ott |
| 6,343,140 | B1 | 1/2002 | Brooks |
| 2004/0052406 | A1 | 3/2004 | Brooks et al. |
| 2009/0262074 | A1* | 10/2009 | Nasiri et al. ............... 345/158 |

FOREIGN PATENT DOCUMENTS

| JP | 49-107151 A | 10/1974 |
| JP | 2001-524333 T | 12/2001 |
| JP | 2002-136504 A | 5/2002 |
| JP | 2002-525134 T | 8/2002 |
| JP | 2002-291047 A | 10/2002 |
| JP | 2007-116318 A | 5/2007 |
| JP | 2007-189421 A | 7/2007 |
| JP | 2008-282084 A | 11/2008 |
| WO | 2009-104437 A | 8/2009 |

* cited by examiner

*Primary Examiner* — Jacob Lipman
(74) *Attorney, Agent, or Firm* — Washida & Associates

(57) ABSTRACT

Provided is a personal verification device capable of easily performing personal verification of a user. In the device, under the condition that a user grasps a case (110) of a game controller (10), a vibration control unit (152) causes a vibration motor (120) arranged inside of the case (110) to vibrate in different patterns. A triaxial acceleration sensor (140) detects vibration generated by the vibration motor (120) which vibrates in the different patterns, and a storage unit (153) stores a plurality of pieces of measurement data obtained by the detection for each of the users. A determination unit (154) performs the personal verification by comparing and collating the data in the storage unit (153) with the measurement data obtained by vibrating the vibration motor (120) under the condition that the user grasps the case (110).

15 Claims, 17 Drawing Sheets

| USER Q | X3 | X2 | X1 | Y3 | Y2 | Y1 | Z3 | Z2 | Z1 |
|---|---|---|---|---|---|---|---|---|---|
| DETECTION VALUE | 84 | 88 | 44 | 27 | 27 | 33 | 117 | 93 | 31 |
| Y-BALANCE ADJUSTMENT | 84 | 88 | 44 | 54 | 54 | 66 | 117 | 93 | 31 |
| GAIN ADJUSTMENT | 3.59 | 3.76 | 1.88 | 2.31 | 2.31 | 2.82 | 5.00 | 3.97 | 1.32 |

| No. | DAY | NUMBER OF TIMES | FEMALE D ||||||||||
| --- | --- | --- | --- | --- | --- | --- | --- | --- | --- | --- | --- |
| | | | X3 | X2 | X1 | Y3 | Y2 | Y1 | Z3 | Z2 | Z1 |
| 10 | 1 | 1 | 102 | 82 | 49 | 35 | 29 | 35 | 122 | 95 | 40 |
| 11 | 2 | 2 | 93 | 82 | 46 | 33 | 29 | 38 | 124 | 99 | 31 |
| 12 | 3 | 3 | 108 | 93 | 46 | 35 | 31 | 38 | 130 | 104 | 42 |
| 13 | 4 | 4 | 104 | 91 | 49 | 33 | 27 | 40 | 124 | 104 | 38 |
| 14 | 5 | 5 | 88 | 99 | 49 | 31 | 33 | 38 | 119 | 97 | 35 |
| AVERAGE | | | 99 | 89.4 | 47.8 | 33.4 | 29.8 | 37.8 | 123.8 | 99.8 | 37.2 |
| Y-BALANCE ADJUSTMENT | | 1 | 102 | 82 | 49 | 70 | 58 | 70 | 122 | 95 | 40 |
| | | 2 | 93 | 82 | 46 | 66 | 58 | 76 | 124 | 99 | 31 |
| | | 3 | 108 | 93 | 46 | 70 | 62 | 76 | 130 | 104 | 42 |
| | | 4 | 104 | 91 | 49 | 66 | 54 | 80 | 124 | 104 | 38 |
| | | 5 | 88 | 99 | 49 | 62 | 66 | 76 | 119 | 97 | 35 |
| AVG | | | 99 | 89.4 | 47.8 | 66.8 | 59.6 | 75.6 | 123.8 | 99.8 | 37.2 |
| GAIN ADJUSTMENT | | 1 | 4.18 | 3.36 | 2.01 | 2.87 | 2.38 | 2.87 | 5.00 | 3.89 | 1.64 |
| | | 2 | 3.75 | 3.31 | 1.85 | 2.66 | 2.34 | 3.06 | 5.00 | 3.99 | 1.25 |
| | | 3 | 4.15 | 3.58 | 1.77 | 2.69 | 2.38 | 2.92 | 5.00 | 4.00 | 1.62 |
| | | 4 | 4.19 | 3.67 | 1.98 | 2.61 | 2.18 | 3.23 | 5.00 | 4.19 | 1.53 |
| | | 5 | 3.70 | 4.16 | 2.06 | 2.61 | 2.77 | 3.19 | 5.00 | 4.08 | 1.47 |
| AVG | | | 4.00 | 3.61 | 1.93 | 2.70 | 2.41 | 3.05 | 5.00 | 4.03 | 1.50 |

FIG.13

| PER-MEASUREMENT-TIME DATA | X3 | X2 | X1 | Y3 | Y2 | Y1 | Z3 | Z2 | Z1 | DIFFERENCE SUM | RANKING |
|---|---|---|---|---|---|---|---|---|---|---|---|
| 1 | 0.3488 | 0.1600 | 0.0163 | 0.3149 | 0.0048 | 0.0023 | 0.0000 | 0.0065 | 0.0989 | 0.95 | 9 |
| 2 | 0.0257 | 0.2063 | 0.0007 | 0.1250 | 0.0010 | 0.0595 | 0.0000 | 0.0003 | 0.0056 | 0.42 | 1 |
| 3 | 0.3182 | 0.0338 | 0.0123 | 0.1479 | 0.0059 | 0.0105 | 0.0000 | 0.0007 | 0.0844 | 0.61 | 5 |
| 4 | 0.3646 | 0.0083 | 0.0091 | 0.1250 | 0.0170 | 0.1643 | 0.0000 | 0.0480 | 0.0430 | 0.78 | 8 |
| 5 | 0.0116 | 0.1592 | 0.0319 | 0.0884 | 0.2166 | 0.1390 | 0.0000 | 0.0103 | 0.0213 | 0.68 | 7 |
| AVG | 0.1670 | 0.0225 | 0.0025 | 0.1523 | 0.0099 | 0.0542 | 0.0000 | 0.0032 | 0.0316 | 0.44 | 2 |

DIFFERENTIAL ANALYSIS

FIG.14

$$\text{Personal} = \{AccX_{0-10Hz}, AccX_{10-20Hz}, \cdots, AccX_{190-200Hz}, AccY_{0-10Hz}, \cdots,$$
$$AccZ_{190-200Hz},$$
$$RotX_{0-10Hz}, RotX_{10-20Hz}, \cdots, RotX_{190-200Hz}, RotY_{0-10Hz}, \cdots,$$
$$RotZ_{190-200Hz}\}$$

FIG.22

$$\text{Weight} = \{Weight_{0-10Hz}, Weight_{10-20Hz}, \cdots, Weight_{190-200Hz}\}$$

FIG.23

$$\text{Diff} = |(\text{Personal\_A} - \text{Personal\_B}) \cdot \text{Weight}| =$$
$$(PersonalA.AccX_{0-10Hz} - PersonalB.AccX_{0-10Hz})^2 \cdot Weight_{0-10Hz} +$$
$$(PersonalA.AccX_{10-20Hz} - PersonalB.AccX_{10-20Hz})^2 \cdot Weight_{10-20Hz} + \cdots +$$
$$(PersonalA.AccX_{190-200Hz} - PersonalB.AccX_{190-200Hz})^2 \cdot Weight_{190-200Hz} +$$
$$(PersonalA.AccY_{0-10Hz} - PersonalB.AccY_{0-10Hz})^2 \cdot Weight_{0-10Hz} + \cdots +$$
$$(PersonalA.AccZ_{0-10Hz} - PersonalB.AccZ_{0-10Hz})^2 \cdot Weight_{0-10Hz} + \cdots +$$
$$(PersonalA.RotY_{0-10Hz} - PersonalB.RotY_{0-10Hz})^2 \cdot Weight_{0-10Hz} + \cdots +$$
$$(PersonalA.RotZ_{190-200Hz} - PersonalB.RotZ_{190-200Hz})^2 \cdot Weight_{190-200Hz}$$

FIG.24

PERSONAL VERIFICATION DEVICE

TECHNICAL FIELD

The present invention relates to a personal authentication apparatus that performs personal authentication of a user, and more particularly to a personal authentication apparatus installed in a game controller.

BACKGROUND ART

Currently, in addition to password authentication by means of 4-digit input, authentication using an acceleration sensor such as shown in Patent Document 1, for example, is known when performing personal authentication of a user with an electronic device such as a mobile phone.

In Patent Document 1, a mobile phone movement pattern when a user waves or inclines a mobile phone is authenticated as personal authentication information using an acceleration sensor installed in the mobile phone.

CITATION LIST

Patent Literature

Patent Document 1: Japanese Patent Application Laid-Open No. 2007-116318

SUMMARY OF INVENTION

Technical Problem

However, with a configuration according to Patent Document 1, authenticating a user involves the inconvenience of waving, inclining, or similarly moving a mobile phone in order for an acceleration sensor installed in the mobile phone to detect a movement pattern of the mobile phone.

In recent years, there has been a demand for an apparatus that enables personal authentication of a user to be performed easily without moving the actual housing of the apparatus.

The present invention has been implemented taking into account the problem described above, and it is an object of the present invention to provide a personal authentication apparatus that enables personal authentication of a user to be performed easily.

Solution to Problem

One aspect of a personal authentication apparatus of the present invention employs a configuration having: a vibration source provided inside a housing; a vibration control section that causes the vibration source to vibrate in a different pattern when a user is gripping the housing; a multiaxial sensor that detects a plurality of vibrations in n-dimensional directions; a storage section that stores, on a user-by-user basis, a plurality of measurement data obtained by detection by the multiaxial sensor of vibration generated by a vibration source that vibrates in a different pattern; and a determination section that performs personal authentication by comparing and collating measurement data obtained by causing the vibration source to vibrate when a user is gripping the housing with data of the storage section.

One aspect of a personal authentication apparatus of the present invention employs a configuration having: a vibration source provided inside a housing; a vibration control section that causes the vibration source to vibrate in a different pattern when a user is gripping the housing and continuously changes the frequency of that vibration source; a multiaxial vibration detection section that detects vibration by the vibration source; an extraction section that extracts respective frequency components from a plurality of measurement data obtained by detection by the multiaxial vibration detection section for each frequency of the vibration source that changes continuously; a processing section that performs processing and output for each frequency component; a storage section that stores the processed frequency components on a user-by-user basis; and a determination section that performs personal authentication by comparing and collating a frequency component extracted from measurement data obtained by causing the vibration source to vibrate when a user is gripping the housing with a frequency component stored in the storage section.

One aspect of a program of the present invention causes a computer enabling communication with a game controller in which a vibration source and a triaxial acceleration sensor that detects a plurality of vibrations in 3-dimensional directions and a communication section are installed inside a housing to function as: a vibration control section that causes the vibration source to vibrate in a different pattern when a user is gripping the housing; a storage section that stores, on a user-by-user basis, a plurality of measurement data obtained by detection by the triaxial acceleration sensor of vibration generated by a vibration source that vibrates in a different pattern; and a determination section that performs personal authentication by comparing and collating measurement data obtained by causing the vibration source to vibrate when a user is gripping the housing with data of the storage section.

Advantageous Effects of Invention

The present invention enables personal authentication of a user to be performed easily.

BRIEF DESCRIPTION OF THE DRAWINGS

FIG. 13 is a table showing parameters composing the personal data shown in FIGS. 8A through 8F;

FIG. 14 is a table showing examples of differential analysis values, difference sums, and rankings calculated by a determination section;

FIG. 22 is a drawing showing pre-processing personal data;

FIG. 23 is a drawing provided to explain a weighting filter; and

FIG. 24 is a drawing showing a personal data difference.

DETAILED DESCRIPTION OF PREFERRED EMBODIMENTS

Now, embodiments of the present invention will be described in detail with reference to the accompanying drawings.

Embodiment 1

Figure 1:
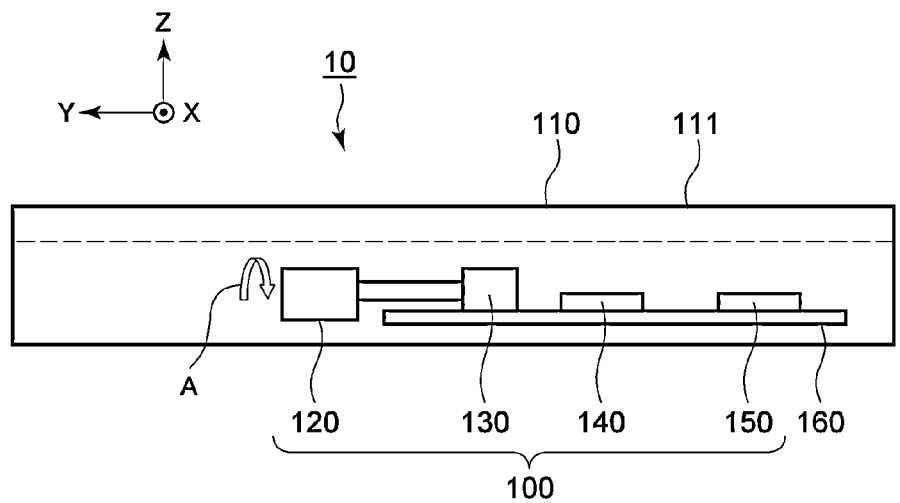
FIG. 1 is a principal-part configuration diagram of a game controller that uses a personal authentication apparatus according to Embodiment 1 of the present invention.
Figure 2:
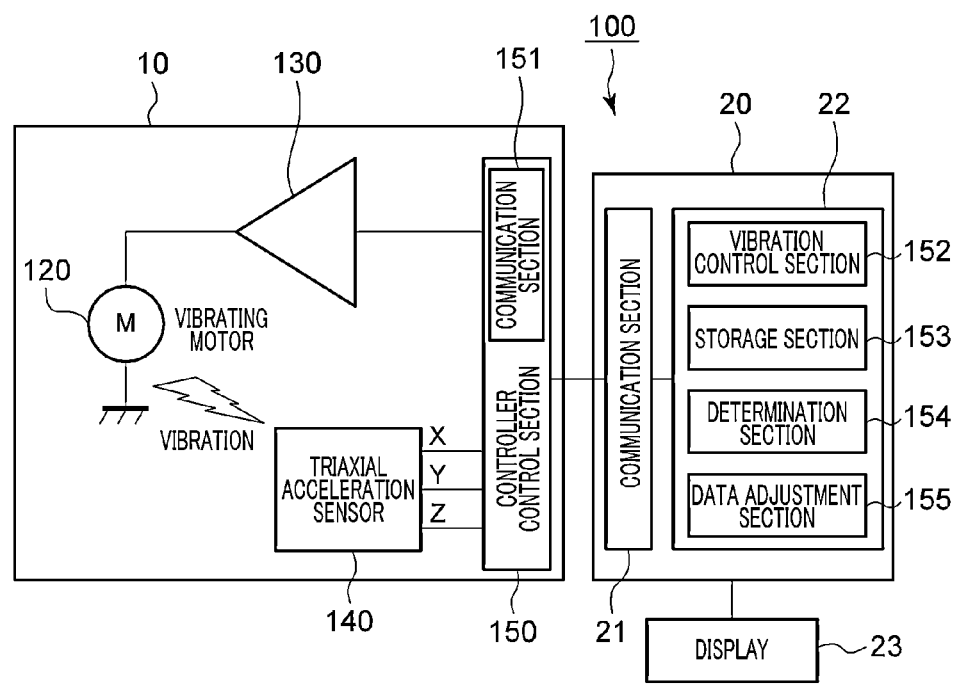
FIG. 2 is a function block diagram showing the above personal authentication apparatus.

FIG. 1 is a principal-part configuration diagram of game controller 10 that uses personal authentication apparatus 100 according to Embodiment 1 of the present invention, and FIG. 2 is a function block diagram showing this personal authentication apparatus 100.

Game controller 10 shown in FIG. 1 forms a game apparatus together with game apparatus body 20 (see FIG. 2) connected to display 23 (see FIG. 2) of a home television receiver or the like via a connecting cable.

Game controller 10 mainly functions as an operating device that operates (manipulates) a player object appearing in a game space displayed on display 23 to which game apparatus body 20 is connected, and provides operating information to game apparatus body 20. Game controller 10 is provided with a plurality of operating units such as operating buttons, keys, joysticks, and so forth (not shown).

Game apparatus body 20 has main control section 22 (see FIG. 2) in which, for example, various microprocessors such as a CPU (Central Processing Unit), GPU (Graphics Processing Unit), and DSP (Digital Signal Processor), an ASIC (Application Specific Integrated Circuit), IC memory, and the like, are mounted, a reading section that reads an information storage medium such as an optical disk, memory card, or the like (not shown), and so forth.

In game apparatus body 20, main control section 22 reads and executes a game program and various kinds of setting data from an information storage medium, and displays the result on display 23 as a game image. Game apparatus body 20 and game controller 10 are connected by means of radio communication, and game apparatus body 20 receives transmission information including operating information, authentication information, and the like, transmitted from game controller 10 via communication section 21.

Based on operating information transmitted from game controller 10, main control section 22 of game apparatus body 20 executes various game computations, generates an image such as a game image, and displays this on display 23. Also, based on verification information transmitted from game controller 10, main control section 22 of game apparatus body 20 executes program data, generates a verification information image, and displays this on display 23. Game apparatus body 20 and game controller 10 perform data transmission/reception via their respective communication sections 21 and 151, using Bluetooth (registered trademark) here, but may also perform data transmission/reception via UWB (Ultra Wide Band), a wireless LAN, or suchlike short-range radio communication.

Game controller 10 has vibrating motor (vibration source) 120 as a vibration source that vibrates housing 110, drive circuit section 130 that drives vibrating motor 120, triaxial acceleration sensor (multiaxial sensor) 140, and controller control section 150 having communication section 151, installed in housing 110.

Personal authentication apparatus 100 is provided with vibrating motor 120, drive circuit section 130, and triaxial acceleration sensor 140, installed in housing 110 of game controller 10, and vibration control section 152, storage section 153, determination section 154, and data adjustment section 155.

Housing 110 of game controller 10 is bar-shaped, with a square cross-section and beveled edges. Housing 110 is used by being gripped by a user at one end (called the rear part) in the longitudinal direction.

Figure 3:
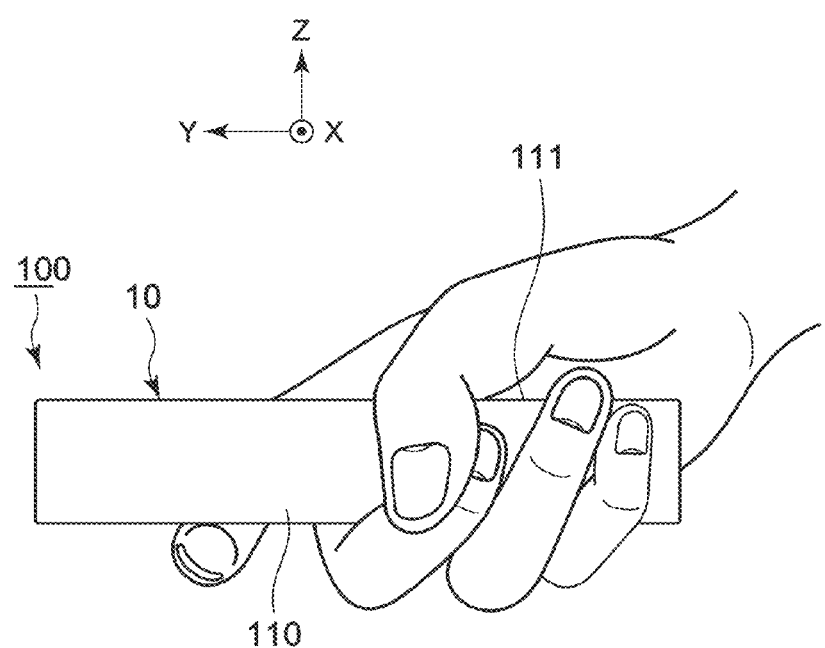
FIG. 3 is a drawing showing a game controller gripped by a user.

FIG. 3 is a drawing showing game controller 10 gripped by a user.

With housing 110 of game controller 10 shown in FIG. 3, the rear part gripped by a user is called grip section 111. In the state shown in FIG. 3, personal authentication apparatus 100 (see FIG. 2) performs personal authentication of a user, without the housing being consciously moved by the user, by using measurement data obtained by driving vibrating motor 120 and detecting this by means of triaxial acceleration sensor 140. Details of this personal authentication will be given later herein.

In housing 110, board 160 is installed on the inside of grip section 111 located at the rear. Drive circuit section 130, triaxial acceleration sensor 140, and controller control section 150 are mounted on board 160. Also, inside housing 110, vibrating motor 120 is installed at the opposite end from grip section 111 (called the front part).

Vibrating motor 120 is installed so that its rotating shaft lies in the longitudinal direction of housing 110, and an off-center weight is attached to this rotating shaft. Here, vibrating motor 120 is installed in housing 110 with its rotating shaft parallel to the longitudinal direction of housing 110. Vibrating motor 120 generates vibration in housing 110 by having its rotating shaft (not shown) rotated in the direction indicated by arrow A (or in the direction opposite to that indicated by arrow A) by the application of a drive voltage by drive circuit section 130.

Drive circuit section 130 supplies a current by applying a drive voltage to vibrating motor 120 according to a vibration control signal from vibration control section 152 input via communication section 151.

Here, drive circuit section 130 causes vibrating motor 120 to generate vibrations of different frequencies by changing the rotational frequency of vibrating motor 120 by applying a plurality of voltages of different levels to vibrating motor 120 for a fixed period (2 to 3 seconds) based on an input vibration control signal.

Triaxial acceleration sensor 140 is an example of a multi-axial sensor that detects a plurality of vibrations in n-dimensional directions, and here can detect an attitude or operation of housing 110 by detecting a plurality of vibrations in 3-dimensional directions.

To be specific, triaxial acceleration sensor 140 detects acceleration in three orthogonal axial directions, with an other-end direction (forward direction) in the longitudinal direction of housing 110 as a Y-axis positive direction, an upward direction looking from the front as a Z-axis positive direction, and the direction in front of the paper surface of FIG. 1 looking from the front as an X-axis positive direction. Triaxial acceleration sensor 140 outputs a detection signal such as a voltage proportional to a detected acceleration to communication section 21 of game apparatus body 20 via communication section 151 of controller control section 150 on an axis-by-axis basis.

When a user causes vibrating motor 120 to vibrate in a different pattern (at a different vibration frequency) while gripping grip section 111, triaxial acceleration sensor 140 detects vibrations generated in housing 110 on an axis-by-axis basis, and outputs these to controller control section 150. Since it is wished to clearly detect changes in vibration of housing 110 vibrated by driving of vibrating motor 120, it is desirable for triaxial acceleration sensor 140 to be installed at a location as far away as possible from vibrating motor 120.

Controller control section 150 controls input/output between various input devices and output devices interconnected by means of a local bus circuit using an IIC (Inter-Integrated Circuit) bus or the like, for example.

In controller control section 150 are mounted electronic parts including various kinds of microchips such as a CPU, a bus controller IC controlling data communication in the local bus circuit, IC memory, and the like, a short-range communication module—communication section 151—that implements radio communication with the communication section of the game apparatus body, and so forth. Controller control section 150 generates operation input signals based on signals transmitted from various input devices via the local bus circuit, and transmits a generated operation input signal to game apparatus body 20 via communication section 151. Also, controller control section 150 receives a signal transmitted from game apparatus body 20 via communication section 151, generates a control signal, and sends this control signal to an output device associated with the received signal. A description of processing that generates and sends a signal output in response to an input signal in controller control section 150 is omitted below. Controller control section 150 also outputs a vibration control signal from vibration control section 152 to drive circuit section 130, and outputs acceleration data (vibration data) input from triaxial acceleration sensor 140 to determination section 154, storage section 153, and data adjustment section 155 of main control section 22 via communication section 151.

Vibration control section 152 is a section that controls driving of vibrating motor 120, and causes vibrating motor 120 to vibrate in a different pattern by switching a voltage supplied to vibrating motor 120 via drive circuit section 130 when a user is gripping housing 110. In other words, vibration control section 152 causes vibrating motor 120 to generate a different vibration frequency.

Specifically, when vibration control section 152 causes vibrating motor 120 to vibrate, vibration control section 152 sends a vibration control signal generated by reading a drive voltage value stored in storage section 153 to drive circuit section 130 via communication sections 21 and 151. Here, vibration control section 152 applies drive voltages of 1 V, 2 V, and 3 V, for example, to vibrating motor 120 via drive circuit section 130.

In order to generate different vibration frequencies, drive voltages of different levels supplied to vibrating motor 120 are here set as drive voltages at which a frequency close to or matching the frequency of a user's hand gripping housing 110 is likely to occur when vibrating motor 120 is driven. This because, when the vibration frequency of vibrating motor 120 and the frequency of a user's hand coincide, it is expected that the amplitude of housing 110 will become larger and acceleration detected by triaxial acceleration sensor 140 will become larger. When detected vibration becomes larger, marked differences arise among individuals, and these can be picked up as characteristics of individuals.

With regard to a drive voltage supplied to vibrating motor 120 by vibration control section 152 via drive circuit section 130, statistics on a vibration frequency most likely to resonate with the frequency of a user's hand when a user is gripping housing 110 are obtained for a plurality of users, and the result is a drive voltage that causes vibrating motor 120 to generate the calculated vibration frequency. Thus, a drive voltage switched to by vibration control section 152 is a drive voltage that causes vibrating motor 120 to generate a vibration frequency with which the hand of a respective user is likely to resonate. Therefore, while there have been assumed to be three drive voltages here, the number of drive voltages is not limited to this, and any number may be provided, as long as they are voltages of such a magnitude as to cause vibrating motor 120 to generate a vibration frequency with which a user's hand is likely to resonate, and are a plurality. For example, provision may be made for vibrating motor 120 to be driven by 12 drive voltages.

Storage section 153 stores, on a user-by-user basis, a plurality of measurement data obtained by detection by triaxial acceleration sensor 140 of vibrations generated when a user is gripping housing 110.

Figure 4:
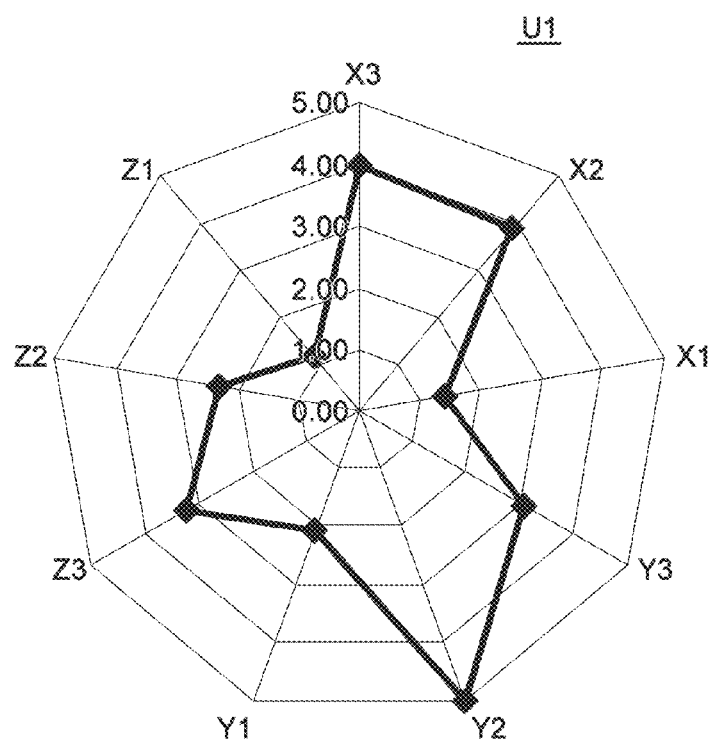
FIG. 4 is a drawing showing personal data obtained by normalizing user measurement data stored in a storage section.
Figure 5A:
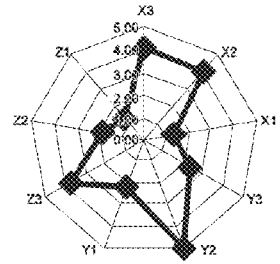
FIG. 5 is a drawing showing personal data stored by a storage section.
Figure 5B:
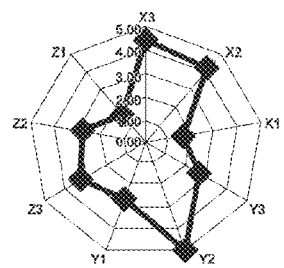
Figure 5C:
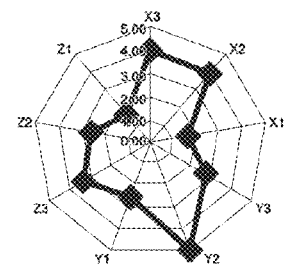
Figure 5D:
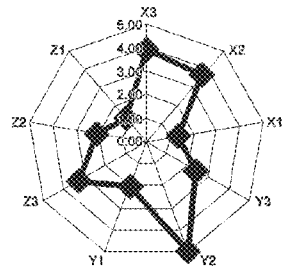
Figure 5E:
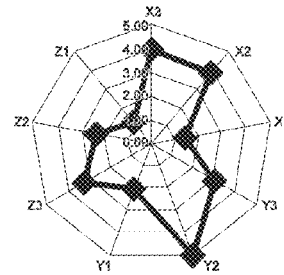
Figure 5F:
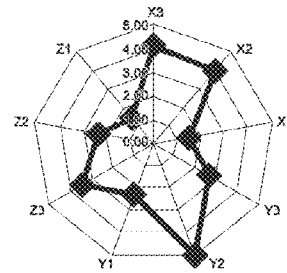
Figure 6A:
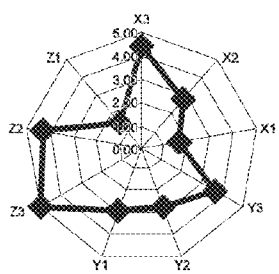
FIG. 6 is a drawing showing personal data stored by a storage section.
Figure 6B:
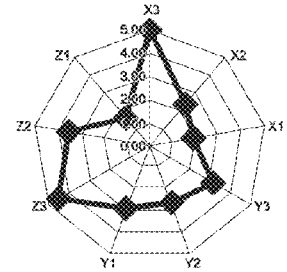
Figure 6C:
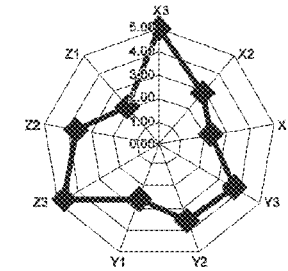
Figure 6D:
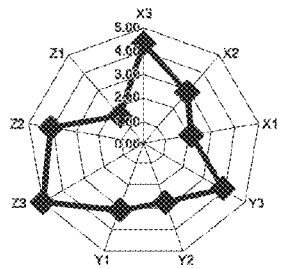
Figure 6E:
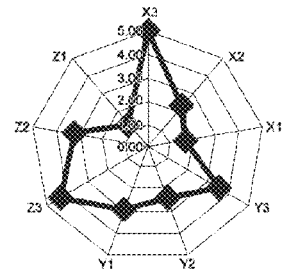
Figure 6F:
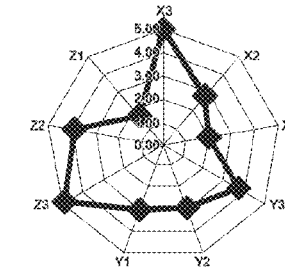
Figure 7A:
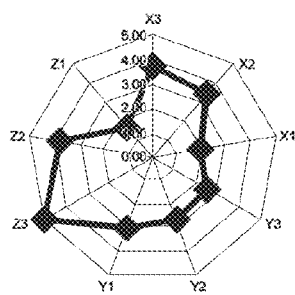
FIG. 7 is a drawing showing personal data stored by a storage section.
Figure 7B:
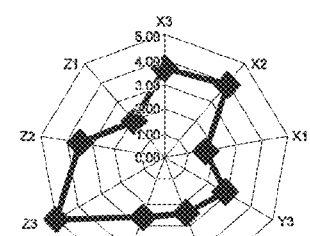
Figure 7C:
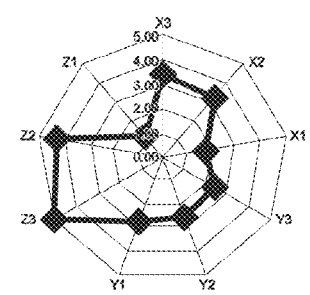
Figure 7D:
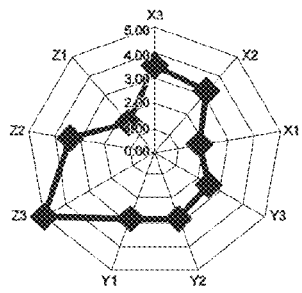
Figure 7E:
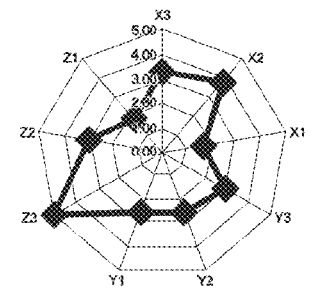
Figure 7F:
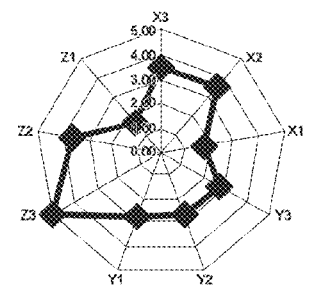
Figure 8A:
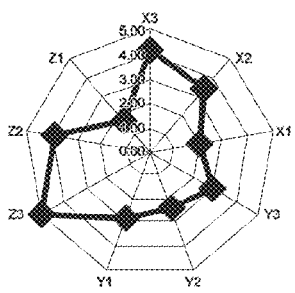
FIG. 8 is a drawing showing personal data stored by a storage section.
Figure 8B:
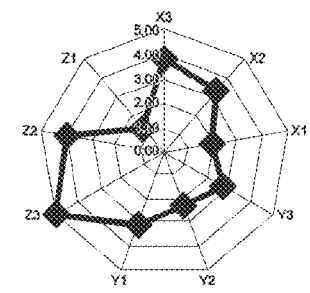
Figure 8C:
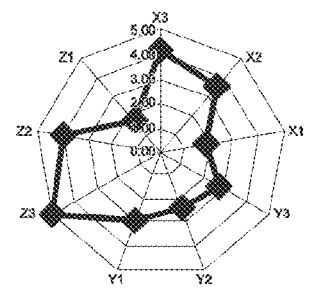
Figure 8D:
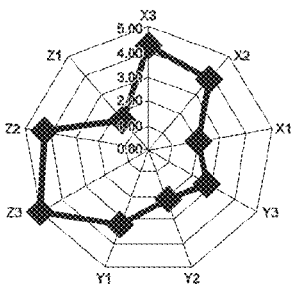
Figure 8E:
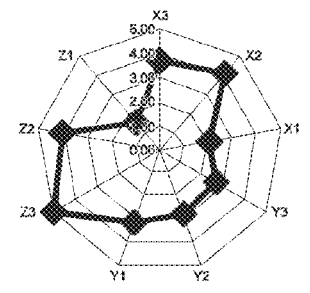
Figure 8F:
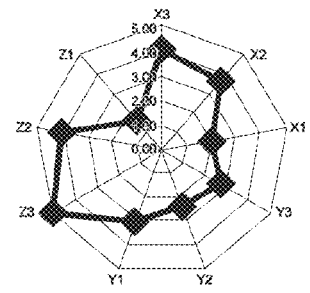
Figure 9A:
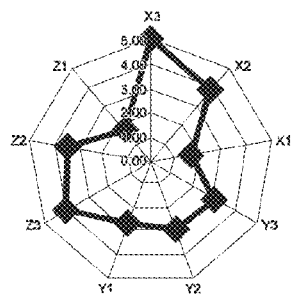
FIG. 9 is a drawing showing personal data stored by a storage section.
Figure 9B:
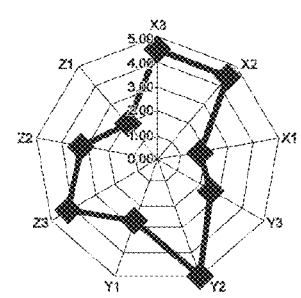
Figure 9C:
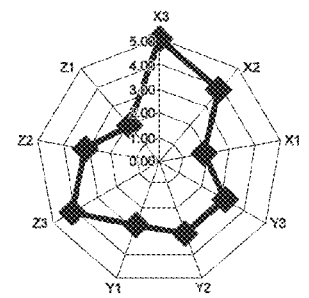
Figure 9D:
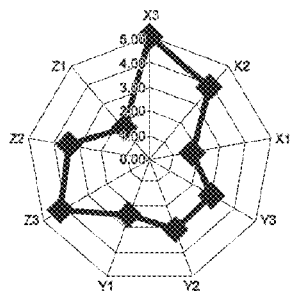
Figure 9E:
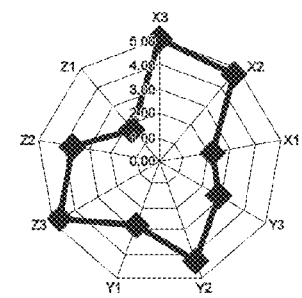
Figure 9F:
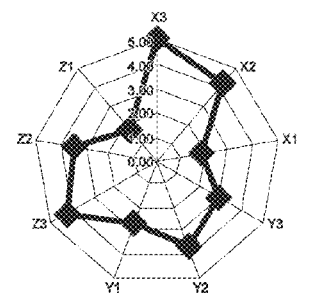

FIG. 4 shows personal data obtained by normalizing user measurement data stored in storage section 153.

Personal data U1 shown in FIG. 4 is here assumed to be personal data U1 of male A. As shown in FIG. 4, user personal data U1 indicates a plurality of data obtained by means of vibrating motor 120 (see FIG. 2) that vibrates in different patterns (here, at different vibration frequencies generated when drive voltages 1 through 3 are supplied) when a male (MA)—the user—is gripping housing 110 (see FIG. 3).

X1, Y1, and Z1 indicate data detected for the X-axis, Y-axis, and Z-axis, respectively, when drive voltage 1 is applied, and X2, Y2, and Z2 indicate data detected for the X-axis, Y-axis, and Z-axis, respectively, when drive voltage 2 is applied. X3, Y3, and Z3 indicate data (acceleration data) detected for the X-axis, Y-axis, and Z-axis, respectively, when drive voltage 3 is applied.

This personal data U1 comprises a radar chart in which per-drive-voltage data for each of the X-axis, Y-axis, and Z-axis directions is shown as a matrix. To be specific, personal data U1 shown in FIG. 4 comprises a radar chart in which a normalized plurality of measurement data are shown as a matrix, with X1, Y1, and Z1—that is, X-axis, Y-axis, and Z-axis measurement data (to be precise, normalized data) when drive voltage 1 is applied to vibrating motor 120—being 1.40, 2.07, and 1.17, respectively. Similarly, X2, Y2, and Z2 are 3.83, 5.00, and 2.30, respectively, and X3, Y3, and Z3 are 3.97, 3.07, and 3.23, respectively.

With this personal data U1, if data of a particular axis among the data of each axis obtained by triaxial acceleration sensor 140 has a smaller numeric value than the other data, balance adjustment is performed by means of correction performed at the time of measurement, and a user's characteristics are manifested on each axis.

This correction is amplification of a value of data indicating axial-direction amplitude detected for an axis with a small detected amount of vibration, and is here performed by data adjustment section 155 at the time of personal data creation. Provision may also be made for amplification of a value of data detected for an axis with a small detected amount of vibration to be performed when triaxial acceleration sensor 140 acquires data, and for data to be input to data adjustment section 155 in an amplified state. In this case, data adjustment section 155 need only perform normalization.

When drive voltages are applied in this way, after balance adjustment has been performed, data (vibration data) detected for the X-axis, Y-axis, and Z-axis, respectively are normalized by adjusting the dynamic range for data obtained in one round of measurement—that is, by performing gain adjustment of each of the data in measurement data U1 so that the MAX value of data in the measurement data becomes the MAX value in that measurement data (here, "5"). Thus, personal data U1 can also be called data obtained by normalizing measurement data, and functions as a personal authentication ID. Personal data U1 also becomes history data by being stored in storage section 153. In personal data, adjustment of each of the measurement data is performed by data adjustment section 155.

In game controller 10 of this embodiment, the rotating shaft of vibrating motor 120 is installed along the Y-axis inside housing 110. As a result, Y-axis acceleration in data obtained by triaxial acceleration sensor 140 when vibrating motor 120 is driven while housing 110 is being gripped is smaller than for the other axes. Therefore, data adjustment section 155 first doubles Y-axis acceleration data detected by triaxial acceleration sensor 140, and then performs personal data calculation taking the largest acceleration among the measurement data to be 5, and maintaining the balance of data with respect to the other accelerations as a whole as is.

Such user personal data is stored by storage section 153 on a user-by-user basis. Storage section 153 stores measurement data for a plurality of past occasions (here, five occasions) in a ring buffer on a user-by-user basis.

Here, storage section 153 stores personal data of five past occasions (history data) on a user-by-user basis, and stores user average personal data (average history data), created by averaging these five occasions, on a user-by-user basis. These personal data stored in storage section 153 on a user-by-user basis are also called history data.

FIG. 5 through FIG. 9 show personal data (history data) stored by storage section 153. FIGS. 5A through 5F show personal data (history data) of user MA for five past occasions arranged in old-to-new order, and user average personal data (average history data) created by averaging these five occasions.

Similarly, FIGS. 6A through 6F show personal data (history data) of user MB (male B) for 5 past occasions arranged in old-to-new order, and user average personal data (average history data) created by averaging these five occasions; FIGS. 7A through 7F show personal data (history data) of user MC (male C) for five past occasions arranged in old-to-new order, and user average personal data (average history data) created by averaging these five occasions; FIGS. 8A through 8F show personal data (history data) of user FD (female D) for five past occasions arranged in old-to-new order, and user average personal data (average history data) created by averaging these five occasions; and FIGS. 9A through 9F show personal data (history data) of user FE (female E) for five past occasions arranged in old-to-new order, and user average personal data (average history data) created by averaging these five occasions.

As shown by the personal data (history data) in FIG. 5 through FIG. 9, personal data and average personal data obtained by triaxial acceleration sensor 140 differ on a user-by-user basis even under the same conditions, with characteristics appearing on a user-by-user basis according to the relationship between a user's way of gripping housing 110, strength of grip, hand size, and so forth. In this embodiment, it is assumed that storage section 153 stores data for five users—three males and two females—but this is not a limitation, and data for any number of users in excess of one may be stored. Also, personal data—that is, per-user past measurement data—has been assumed to be stored for five past occasions, but personal data may be stored for any number of occasions. It is desirable for storage section 153 to store per-user personal data for at least two occasions, and if personal data is stored for only one occasion, average personal data need not be stored.

Determination section 154 performs personal authentication by comparing and collating measurement data obtained by causing vibrating motor 120 to vibrate when a user is gripping housing 110 with data in storage section 153.

To be specific, determination section 154 compares and collates user measurement data detected by triaxial acceleration sensor 140 and normalized as personal data by data adjustment section 155 with personal data stored in storage section 153 as history data. Here, the shape (balance of acceleration in each axial direction for each drive voltage) of a personal data chart (see FIG. 4) is the basis for comparison and collation. Determination section 154 determines users whose personal data has a higher degree of similarity with normalized user measurement data from among all history data, including average history data, to be correspondingly more likely to be the same person.

Specifically, differences between per-drive-voltage values for each axis in the personal data of a user subject to authentication and corresponding per-drive-voltage values for each axis in personal data (history data) are calculated, and the calculated differences are squared to give differential analysis values.

Then the sum of the calculated differential analysis values is calculated. In this way, determination section 154 calculates the sum of differential analysis values of one set of personal data (history data) for all personal data (history data), and compares the sums of differential analysis values of each of the history data. As a result of the comparison, as collation processing, determination section 154 performs ranking of sums of differential analysis values in order of proximity to 0, and determines a user whose personal data (history data) has a high ranking to be the same person as a user subject to authentication. That is to say, determination section 154 finds differences between all personal data (history data) and measurement data (here, subtracts nine items of data in user measurement data respectively from data composing corresponding personal data), squares each and deletes the +/− sign, and performs ranking in order of proximity to 0, the value to be matched to that value. In the ranking process, if a sum of differential analysis values is large and not close to 0, personal data corresponding to these data are omitted in performing ranking.

Thus, determination section 154 determines a user for whom the degree of similarity to measurement data of a user subject to authentication is highest among a plurality of history data, which is past measurement data stored on a user-by-user basis, to be the same person.

Here, personal data (history data) and average-value personal data obtained from personal data (history data) are stored in storage section 153. Determination section 154 determines a user corresponding to data with the highest degree of similarity to measurement data among the personal data (history data) and average personal data stored in storage section 153 to be the same person. Consequently, user authentication is improved.

Thus, in making a determination by comparing personal data that is past history data and functions as a personal ID with measurement data of a user currently being authenticated, determination section 154 does not collate an axis for which a characteristic as a personal difference is most manifested, but performs collation using all measurement data indicating acceleration (vibration) detected for each corresponding axis.

By means of determination section 154, users determined to be the same person are shown via display 23 in sequential person units as candidates for a user subject to authentication by means of a function of main control section 22. A user subject to authentication can perform confirmation of that authentication by pressing an operating button on game controller 10, for instance, based on this shown information. Determination section 154 collation processing has been described as performing ranking in order of proximity to 0 of sums of differential analysis values, and determining a user whose history data has a high ranking to be the same person as a user subject to authentication, but the determination method is not limited to this. For example, rankings may be summed on a user-by-user basis, and a user for whom that sum is smallest may be determined to be the same person as a user subject to authentication.

The operation of personal authentication apparatus 100 configured in this way will now be described.

Figure 10:
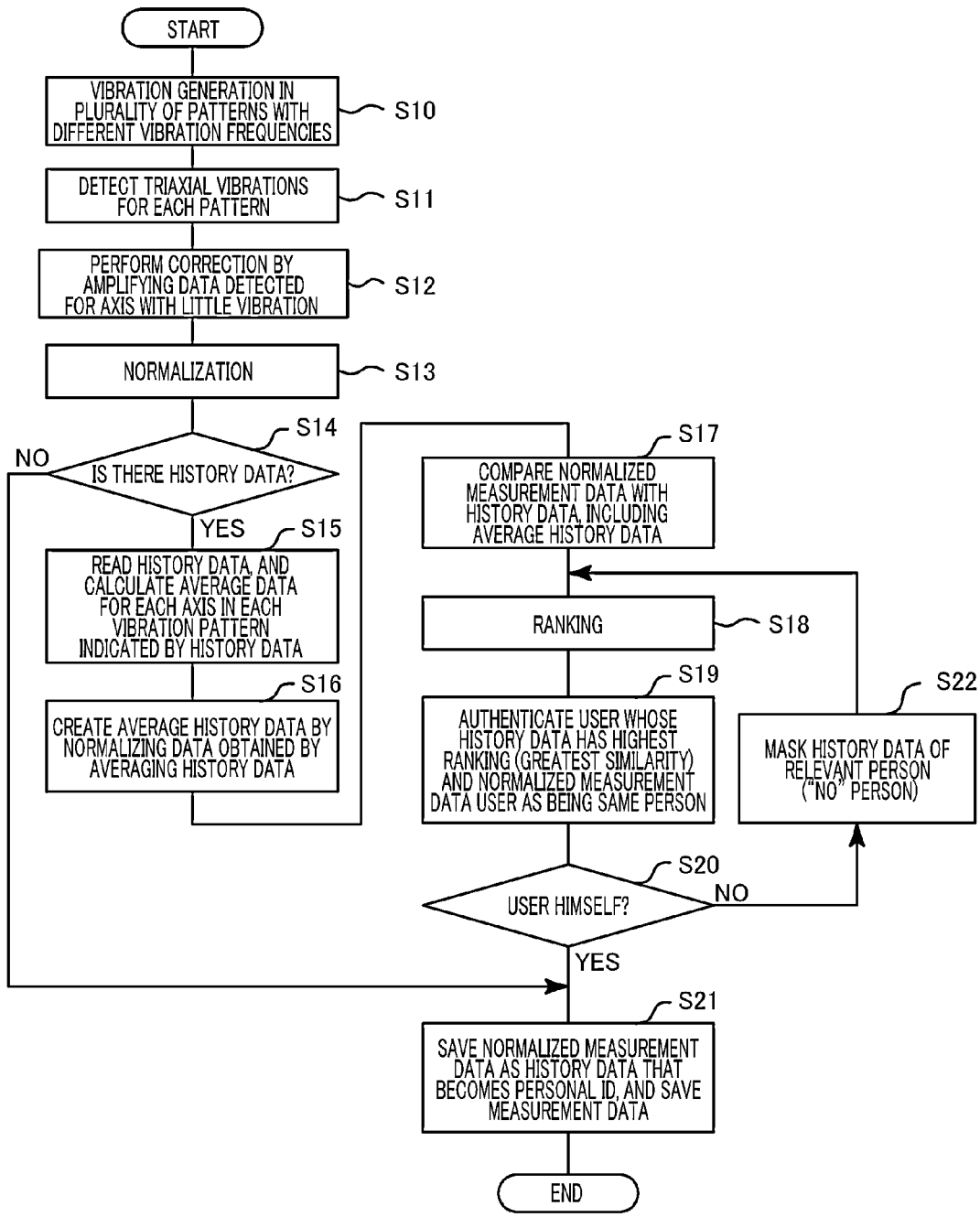
FIG. 10 is a flowchart for explaining authentication processing of a personal authentication apparatus according to Embodiment 1 of the present invention.

FIG. 10 is a flowchart for explaining authentication processing of personal authentication apparatus 100 according to Embodiment 1 of the present invention.

First, a user grips grip section 111 of housing 110 of game controller 10 as shown in FIG. 3, and causes personal authentication apparatus 100 to start authentication processing via game controller 10. This start of authentication processing may be performed, for example, by pressing an operating button provided on game controller 10, and transmitting an authentication processing start signal to main control section 22 of game apparatus body 20 via communication sections 151 and 21, or by operating game apparatus body 20 itself.

When authentication processing is started, in step S10 vibration control section 152 reads a drive voltage value stored in storage section 153, and transmits this to game controller 10 via communication section 21. A drive control signal from vibration control section 152 is input to drive circuit section 130 via communication section 151, and drives vibrating motor 120. By this means, vibrating motor 120 vibrates in a plurality of patterns with different vibration frequencies.

In step S11, triaxial acceleration sensor 140 detects X-axis, Y-axis, and Z-axis vibrations (accelerations) for each vibration pattern (here, for each frequency generated by vibrating motor 120 due to a difference of drive voltage), and outputs these to main control section 22 via communication section 151.

In step S12, data adjustment section 155 performs correction by amplifying data for which output is small—that is, data for which vibration is small—from among the X-axis, Y-axis, and Z-axis accelerations detected by triaxial acceleration sensor 140, and outputs the data. Due to the positioning of vibrating motor 120, when vibrating motor 120 is driven, amplitude in the axial direction parallel to the center of the rotation direction—here, the Y-axis direction—is small. Consequently, when housing 110 is made to vibrate while being gripped by the user, vibration in the Y-axis direction is small, and user individual differences do not readily emerge. In step S12, data adjustment section 155 performs balance adjustment of X-, Y-, and Z-axis output by making small-value detection data (here, a value indicating Y-axis vibration) larger among the X-, Y-, and Z-axis direction detection data (vibration data) output from triaxial acceleration sensor 140. By this means, user individual differences more readily appear in detection data from triaxial acceleration sensor 140.

In step S12, data adjustment section 155 doubles, for example, a value for the Y-axis that has a small output value—that is, a small amplitude—but adjustment is not limited to this.

In step S13, data adjustment section 155 performs normalization by performing gain adjustment of all data composing measurement data (acceleration data of each axis indicating vibration on each axis for each drive voltage) for user measurement data detected in one round of measurement so that the MAX value becomes the MAX value of user measurement data. Here, the dynamic range is adjusted for each of the measurement data obtained in one round of user measurement—that is, gain adjustment is performed so that the max value of data in the measurement data becomes a predetermined value (here, 5).

In step S14, determination section 154 checks whether there is history data in storage section 153, and proceeds to step S21 if history data is not stored in storage section 153, or proceeds to step S15 if there is history data in storage section 153.

In step S21, determination section 154 saves normalized measurement data in storage section 153 as history data that becomes a user's personal ID, holds pre-normalization measurement data in storage section 153, associated with the normalized measurement data user, and terminates the processing.

In step S15, data adjustment section 155 reads history data from storage section 153, and calculates, on a user-by-user basis, average data of data indicating vibration on each axis for each vibration pattern (different drive voltage).

In step S16, data adjustment section 155 creates per-user average history data by normalizing data obtained by averaging history data.

In step S17, determination section 154 compares normalized measurement data with all history data, including average history data. Determination section 154 processing in this step S17 is the comparison processing in the above-mentioned comparison and collation processing.

In step S18, determination section 154 compares normalized measurement data with all history data, including average history data, performs ranking of all history data, including average history data, in descending order of similarity to normalized measurement data, and proceeds to step S19. Determination section 154 processing in this step S18 is the collation processing in the above-mentioned comparison and collation processing.

In step S19, determination section 154 authenticates a user with the highest ranking—that is, whose personal data has the greatest similarity—among ranked history data (personal data) comprising personal IDs, and a normalized measurement data user, as being the same person, and proceeds to step S20.

In step S20, determination section 154 indicates to the normalized measurement data user whether or not the user is the authenticated history data user himself (the relevant person), and proceeds to step S21 if the user himself, or proceeds to step S22 if not the user himself.

In step S22, history data (personal data) authenticated as for the same person according to the rankings is masked, and the processing flow proceeds to step S18. Specifically, in step S22, determination section 154 masks all user history data of history data authenticated as for the same person according to the rankings. In step S18, determination section 154 again performs ranking of all history data (history data including average history data), excluding masked history data, in descending order of similarity to normalized measurement data, and repeats the subsequent processing.

Thus, with a game apparatus provided with personal authentication apparatus 100, game apparatus body 20 performs identification of an individual using game controller 10, and switching to a setting and function corresponding to that individual can be performed on the game apparatus body 20 side.

Figures 11, 12:
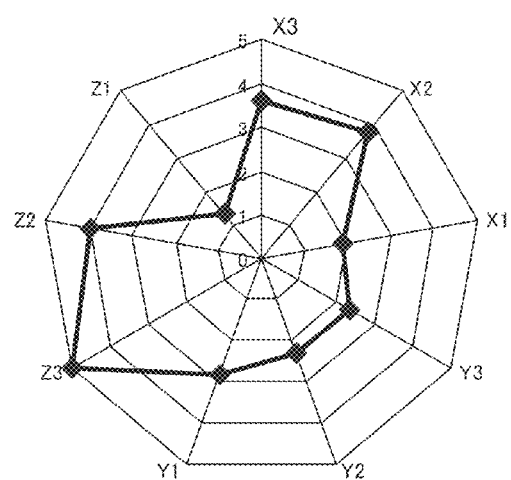
FIG. 11 is a table showing parameters composing measurement data of a user subject to authentication.
FIG. 12 is a drawing showing personal data obtained by normalizing the measurement data in FIG. 11.

A personal authentication operation by controller control section 150 in personal authentication apparatus 100 of this embodiment will now be described with reference to FIG. 11 through FIG. 14, taking a case in which user Q is authenticated as an example. The numeric values shown in FIG. 12 and FIG. 13 are valid to 14 decimal places, but values rounded to two decimal places are given in the drawings for convenience. Differential analysis values shown in FIG. 14 are rounded to four decimal places for convenience.

FIG. 11 is a table showing parameters composing measurement data of user Q subject to authentication (a plurality of measurement data obtained when vibrating motor 120 vibrates at different drive voltages), and FIG. 12 is a drawing showing personal data obtained by normalizing the measurement data in FIG. 11.

The personal data shown in FIG. 12 is obtained by personal authentication apparatus 100, in the same way as the personal data shown in FIG. 4. That is to say, the personal data shown in FIG. 12 is the result of normalizing a plurality of measurement data obtained by triaxial acceleration sensor 140 when vibrating motor 120 (see FIG. 2) is made to vibrate in different patterns (here, at different vibration frequencies generated when drive voltages 1 through 3 are supplied) when a user is gripping housing 110 (see FIG. 3).

In FIG. 11 through FIG. 14, X1 through X3, Y1 through Y3, and Z1 through Z3 have the same meaning as X1 through X3, Y1 through Y3, and Z1 through Z3 in FIG. 4. That is to say, X1, Y1, and Z1 indicate X-axis, Y-axis, and Z-axis acceleration data, respectively, measured by triaxial acceleration sensor 140 when voltage 1 (for example, 1 V) is applied to vibrating motor 120; X2, Y2, and Z2 indicate X-axis, Y-axis, and Z-axis acceleration data, respectively, measured by triaxial acceleration sensor 140 when voltage 2 (for example, 2 V) is applied to vibrating motor 120; and X3, Y3, and Z3 indicate X-axis, Y-axis, and Z-axis acceleration data, respectively, measured by triaxial acceleration sensor 140 when voltage 3 (for example, 3 V) is applied to vibrating motor 120.

In FIG. 11, acceleration data measured for the X-axis, Y-axis, and Z-axis when drive voltages 1, 2, and 3 respectively are applied to vibrating motor 120 when user Q is gripping housing 110 are shown as "detection value" (acceleration).

Also, in FIG. 11, in the detection values indicating per-axis acceleration detected by triaxial acceleration sensor 140, Y-axis detection values are here smaller numeric values than the detection values for the other axes (the X-axis and Z-axis), and therefore balance adjustment is performed for Y-axis detection values, with values being calculated as "Y-balance correction" values.

Also, in FIG. 11, numeric values after such Y-balance adjustment are shown as "GAIN adjustment" values normalized so that a MAX value of data in measurement data becomes a MAX value in that measurement data (here, "5"), as described above. A plurality of measurement data normalized by performing "GAIN adjustment" (hereinafter referred to simply as "data") become parameters composing personal data. The measurement data shown in FIG. 12 is formed by plotting these data.

Such personal data of a user subject to authentication (also called "normalized measurement data", here equivalent to the personal data shown in FIG. 12) undergoes personal authentication by determination section 154 by being compared and collated with history data stored in storage section 153.

The personal data shown in FIGS. 8A through 8F are given here as examples of history data (personal data) compared and collated with normalized measurement data by determination section 154.

FIG. 13 is a table showing parameters composing the personal data (history data) shown in FIGS. 8A through 8F (a plurality of measurement data obtained when vibrating motor 120 vibrates at different drive voltages). The table in FIG. 13 is stored in storage section 153, associated with the personal data shown in FIG. 8.

Although not shown, personal data of other users shown in FIGS. 5 through 7 and FIG. 9 are also stored in storage section 153, associated with similar tables. That is to say, personal data (history data) of other users shown in FIGS. 5 through 7 and FIG. 9 are stored in storage section 153, associated with parameters composing these data (a plurality of measurement data obtained when vibrating motor 120 vibrates at different drive voltages).

In the table shown in FIG. 13, data corresponding to measurement data (FIGS. 8A through 8F) of a specific user (here, female D) is shown. In FIG. 13, "No." indicates the overall number of measurement times by personal authentication apparatus 100 for users overall, and "Number of times" indicates the number of measurement times for user "female D", corresponding to the personal data (history data) in FIGS. 8A through 8E in the order 1, 2, 3, 4, 5. These per-measurement-time measurement data are so-called personal data (history data). "Average" indicates average measurement data for a user (here "female D") calculated by finding the average of these five past occasions.

"Y-balance adjustment" and "GAIN adjustment" indicate correction data obtained by performing adjustment on personal data (data indicated by 1 through 5 and "Average") that is here measurement data measured in the past for "female D", as in the case shown in FIG. 11.

The personal data (history data) shown in FIGS. 6A through 6F respectively are formed by plotting respective measurement data 1 through 5 and AVG after "GAIN adjustment".

Using the radar charts (see FIG. 6) of user (female D) personal data (history data) shown in FIGS. 6A through 6F, determination section 154 calculates a difference between corresponding measurement data when performing comparison and collation with personal data (see FIG. 11 and FIG. 12) which is normalized measurement data of user Q subject to authentication.

That is to say, determination section 154 calculates for each measurement time differences between values (values after "GAIN adjustment") on each axis for each drive voltage in user Q personal data (see FIG. 11 and FIG. 12), and values (values in "GAIN adjustment" of personal data shown in FIG. 8 and FIG. 13) on each axis for each drive voltage corresponding to these values, and squares the calculated differences to obtain differential analysis values.

FIG. 14 is a table showing examples of differential analysis values, difference sums, and rankings calculated by determination section 154.

The table shown in FIG. 14 contains differential analysis values calculated for each axis at each drive voltage for each measurement time. For example, in differential analysis values for user Q and the oldest personal data (per-measurement-time data "1") of a user (here, female D), the drive-voltage-3 X-axis difference is 4.18–3.59, and the square of this is calculated as differential analysis value "0.3488". Regarding this value of "0.3488", although the square of "4.18–3.59" is "0.3481", since data (numeric values) used in these difference calculations are given to two decimal places of the actual valid 14 decimal places, there is a slight difference from the numeric value in FIG. 14. In FIG. 14, the difference between "4.18" and "3.59" is calculated using these values valid to 14 decimal places, and squared, and the result is rounded to four decimal places, giving "0.3488".

Similarly, the X2 and X1 differences in the oldest personal data (per-measurement-time data "1") of female D are 3.36–3.76 and 2.01 (actually 2.00819672131148, but given in the drawing as rounded to two decimal places) −1.88, respectively, and these are squared, and per-drive-voltage differential analysis values for each axis are calculated ("0.1600" and "0.0163" shown in FIG. 4 (the numeric values being slightly different since X1 and X2 data subject to difference calculation are given to only two decimal places, as explained above)).

The sums of the calculated differential analysis values for each measurement time—that is, for each of the personal data (history data)—are then 0.95, 0.42, and 0.61. Then determination section 154 performs collation processing by comparing the sums of differential analysis values for each of the history data, and assigns the rankings shown in FIG. 14. Here, in the per-measurement-time data, the second oldest personal data (history data) is closest to 0, and is ranked first, and the user having this first-ranked personal data (history data) (here, female D) is determined to be the same person as user Q subject to authentication (corresponding to step S19 processing). If there is operation input indicating that female D with the first-ranked personal data (history data) is not the same person as user Q, determination section 154 masks all female D personal data (history data) (personal data assigned rankings of 9, 1, 5, 8, 7, and 2 in FIG. 14). Then determination section 154 performs authentication processing for user Q by performing ranking again using all personal data except female D personal data, and repeating the subsequent processing.

According to this embodiment, a user can perform personal authentication simply by taking up a posture using game controller 10—that is, simply by gripping game controller 10—and personal settings, personal data, and so forth can be freely selected without the user being made aware, enabling operational feeling to be improved.

Also, personal authentication can be performed easily without a user being requested to perform a key operation, or move game controller 10 itself in a predetermined direction.

Furthermore, in recent years, many devices such as game controller 10 have become known that are provided with a vibrator (vibrating motor) for providing a user with an operational feeling, and an acceleration sensor (and in particular, a triaxial acceleration sensor) in order to detect acceleration applied to a device such as game controller 10, and recognize this as part of an operation, as an operation (manipulation) input method in games and applications.

Using a game controller provided with these functions beforehand, personal authentication can be formed easily using only both the vibrator and acceleration sensor functions, and without detriment to either the vibrator or acceleration sensor function.

According to personal authentication apparatus 100 of this embodiment, sensors used when performing personal authentication with the device are smaller and less expensive than in the case of authentication technologies such as fingerprint pattern authentication using a conventional optical sensor, biometric authentication in which vein pattern authentication is performed using infrared light, or authentication by means of image analysis in which an iris pattern, or a pattern of capillaries in the face or retina of the eye, is captured as an image by a camera using an optical sensor. Furthermore, since personal authentication is improved by utilizing vibration of a vibrating motor, additional devices and component parts can be kept to a minimum.

Thus, personal authentication apparatus 100 of this embodiment enables personal authentication to be performed easily by a device provided with a vibrating motor (vibrator) and a multiaxial sensor.

In this embodiment, personal authentication apparatus 100 has been assumed to have a configuration applied to game controller 10 and game apparatus body 20, but the configuration is not limited to this, and personal authentication apparatus 100 may also be installed in game controller 10 itself or in a portable electronic device. That is to say, with regard to the configuration requirements of personal authentication apparatus 100, as long as vibrating motor 120 and triaxial acceleration sensor 140 that detects vibration are installed inside the housing of a device, other configuration requirements may be provided for anywhere.

Specifically, a configuration may be used whereby game controller 10 is an electronic device, and main control section 22 side vibration control section 152, storage section 153, determination section 154, and data adjustment section 155 are installed inside this electronic device together with vibrating motor 120 and triaxial acceleration sensor 140. When using such a configuration, a configuration is desirable such that the electronic device itself is provided with a display section showing authentication, and determination section 154 determination results can be displayed.

In the authentication processing of this embodiment described using the flowchart in FIG. 10, after step S22 the processing flow proceeds to step S18, and determination section 154 again performs ranking of all history data (including average history data), excluding masked history data, in descending order of similarity to normalized measurement data, but processing may also be used in which the processing flow proceeds to step S19 after step S22. In this case, in step S19 determination section 154 performs collation processing again using all history data (including average history data) already ranked in the previous processing. Specifically, determination section 154 authenticates a user with the highest ranking (smallest ranking number) among all users whose history data has already been ranked in the previous processing, excluding users with masked history data, as being the same person as a normalized measurement data user.

A case has here been described by way of example in which the present invention is configured as hardware, but it is also possible for the present invention to be implemented by software. For example, the same kind of functions as those of a personal authentication apparatus according to the present invention can be implemented by writing, in a programming language, an algorithm that causes a computer capable of communicating with a game controller in which vibrating motor 120, triaxial acceleration sensor 140 that detects a plurality of vibrations in 3-dimensional directions, and communication section 151 are installed inside housing 110, to function as vibration control section 152 that causes the vibration source to vibrate in a different pattern when a user is gripping the housing, storage section 153 that stores, on a user-by-user basis, a plurality of measurement data obtained by detection by triaxial acceleration sensor 140 of vibration generated by vibrating motor 120 that vibrates in a different pattern, and a determination section that performs personal authentication by comparing and collating measurement data obtained by causing vibrating motor 120 to vibrate when a user is gripping housing 110 with data in storage section 153, storing this program in memory, and having it executed by a control section.

Embodiment 2

Figure 15:
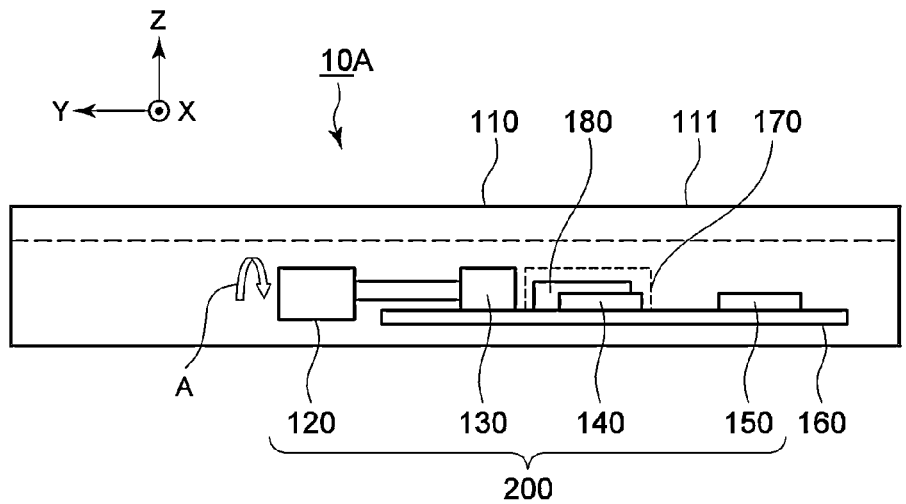
FIG. 15 is a principal-part configuration diagram of a game controller that uses a personal authentication apparatus according to Embodiment 2 of the present invention.
Figure 16:
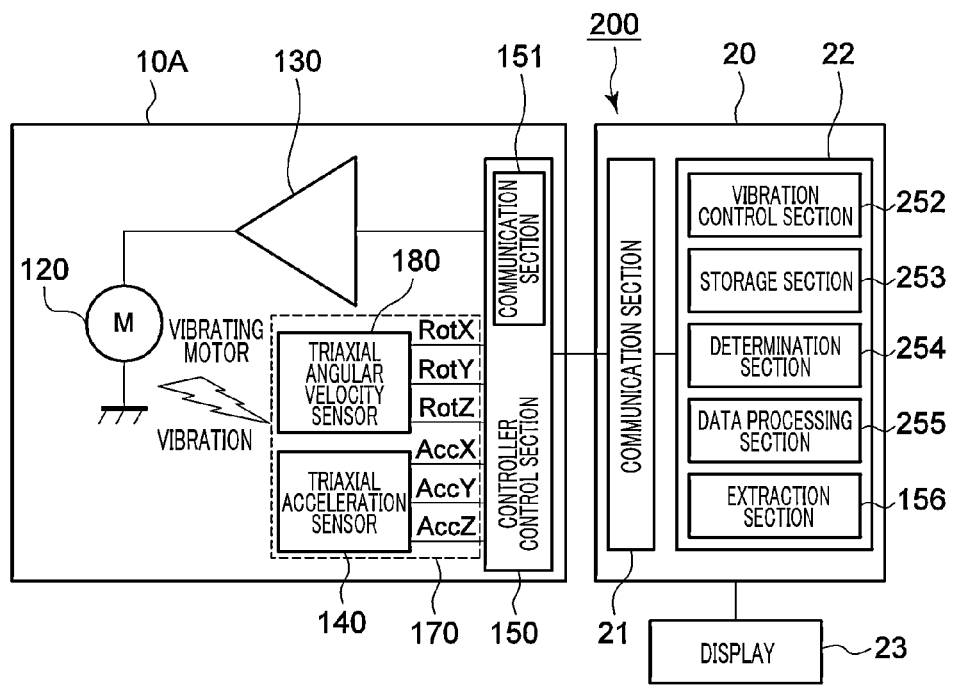
FIG. 16 is a function block diagram showing the above personal authentication apparatus.

FIG. 15 is a principal-part configuration diagram of game controller 10A that uses personal authentication apparatus 200 according to Embodiment 2 of the present invention, and FIG. 16 is a function block diagram showing this personal authentication apparatus 200.

Game controller 10A shown in FIG. 15 forms a game apparatus together with game apparatus body 20 (see FIG. 16) connected to display 23 (see FIG. 16) of a home television receiver or the like via a connecting cable.

Game controller 10A mainly functions as an operating device that operates (manipulates) a player object appearing in a game space displayed on display 23, and provides operating information to game apparatus body 20. Game controller 10A is provided with a plurality of operating units such as operating buttons, keys, joysticks, and so forth (not shown).

Game apparatus body 20 shown in FIG. 16 has main control section 22 (see FIG. 16) in which, for example, various microprocessors such as a CPU (Central Processing Unit), GPU (Graphics Processing Unit), and DSP (Digital Signal Processor), an ASIC (Application Specific Integrated Circuit), IC memory, and the like, are mounted, a reading section that reads an information storage medium such as an optical disk, memory card, or the like (not shown), and so forth.

In game apparatus body 20, main control section 22 reads and executes a game program and various kinds of setting data from an information storage medium, and displays the result on display 23 as a game image.

Game apparatus body 20 and game controller 10A are connected by means of radio communication, and game apparatus body 20 receives transmission information including operating information, authentication information, and the like, transmitted from game controller 10A via communication section 21.

Based on operating information transmitted from game controller 10A, main control section 22 of game apparatus body 20 executes various game computations, generates an image such as a game image, and displays this on display 23. Also, based on verification information transmitted from game controller 10A, main control section 22 of game apparatus body 20 executes program data, generates a verification information image, and displays this on display 23. Game apparatus body 20 and game controller 10A perform data transmission/reception via their respective communication sections 21 and 151, using Bluetooth (registered trademark) here, but may also perform data transmission/reception via UWB (Ultra Wide Band), a wireless LAN, or suchlike short-range radio communication.

Game controller 10A has vibrating motor 120 that vibrates housing 110, drive circuit section 130 that drives vibrating motor 120, controller control section 150 having communication section 151, and vibration detection section 170, installed in housing 110.

Personal authentication apparatus 200 is provided with vibrating motor 120, drive circuit section 130, controller control section 150, vibration control section 252, storage section 253, vibration detection section 170 (triaxial acceleration sensor 140 and triaxial angular velocity sensor 180), extraction section 156, determination section 254, and data processing section 255, installed in housing 110 of game controller 10A. With personal authentication apparatus 200 according to this embodiment, a configuration has been assumed in which vibration control section 252, storage section 253, determination section 254, and data processing section 255 are provided in main control section 22 of game apparatus body 20, but the configuration is not limited to this, and a configuration may also be used in which these sections are provided in game controller 10A itself.

Housing 110 of game controller 10A is bar-shaped, with a square cross-section and beveled edges. Housing 110 is used by being gripped by a user at one end (called the rear part) in the longitudinal direction.

Figure 17:
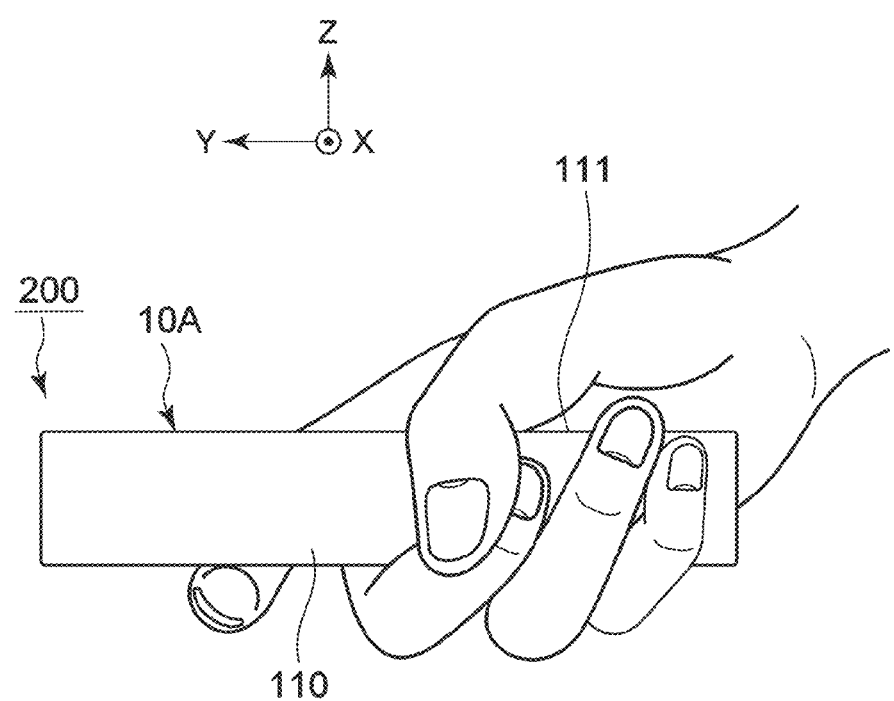
FIG. 17 is a drawing showing a game controller gripped by a user.

FIG. 17 is a drawing showing game controller 10A gripped by a user. With housing 110 of game controller 10A shown in FIG. 17, the rear part gripped by a user is called grip section 111.

In a state in which the X-axis and Y-axis of game controller 10A are level, as shown in FIG. 17, personal authentication apparatus 200 (see FIG. 16) performs personal authentication of a user by driving vibrating motor 120 and using measurement data obtained via vibration detection section 170. This personal authentication can be performed without housing 110 of game controller 10A being consciously moved by the user. Details of this personal authentication will be given later herein.

In housing 110 of game controller 10A, board 160 is installed on the inside of grip section 111 located at the rear. Drive circuit section 130, triaxial acceleration sensor 140, and controller control section 150 are mounted on this board 160. Also, inside housing 110, vibrating motor 120 is installed at the opposite end from grip section 111 (called the front part).

Vibrating motor 120 is installed so that its rotating shaft lies in the longitudinal direction of housing 110, and an off-center weight is attached to this rotating shaft. Here, vibrating motor 120 is installed in housing 110 with its rotating shaft parallel to the longitudinal direction of housing 110—in other words, parallel to the Y-axis direction. Vibrating motor 120 generates vibration in housing 110 by having its rotating shaft (not shown) rotated in the direction indicated by arrow A (or in the direction opposite to that indicated by arrow A) by drive circuit section 130 as shown in FIG. 15.

Drive circuit section 130 supplies a current by applying a drive voltage to vibrating motor 120 according to a vibration control signal from vibration control section 252 input via communication section 151.

Here, drive circuit section 130 causes vibrating motor 120 to generate vibrations of frequencies that change continuously at a constant rate by applying a plurality of voltages of different levels to vibrating motor 120 for a predetermined period (2 to 3 seconds) based on an input vibration control signal.

Vibration detection section 170 has triaxial acceleration sensor 140 and triaxial angular velocity sensor 180 that here detect acceleration and angular velocity on three axes (the X-axis, Y-axis, and Z-axis) as a plurality of vibrations in n-dimensional directions.

Triaxial acceleration sensor 140 is an example of a multi-axial sensor that detects a plurality of vibrations in n-dimensional directions, and here can detect an attitude or operation of housing 110 by detecting a plurality of accelerations in 3-dimensional directions. In the following description, vibrations detected by triaxial acceleration sensor 140 are also referred to as acceleration data.

To be specific, triaxial acceleration sensor 140 detects acceleration in three orthogonal axial directions, with an other-end direction (forward direction) in the longitudinal direction of housing 110 as a Y-axis positive direction, an upward direction looking from the front as a Z-axis positive direction, and the direction in front of the paper surface of FIG. 15 looking from the front as an X-axis positive direction. In the following description, accelerations corresponding to the X-axis, Y-axis, and Z-axis detected and output by triaxial acceleration sensor 140 (acceleration sensor outputs) are called AccX, AccY, and AccZ. Triaxial acceleration sensor 140 outputs a detection signal such as a voltage proportional to a detected acceleration to communication section 21 of game apparatus body 20 via communication section 151 of controller control section 150 on an axis-by-axis basis.

When vibrating motor 120 generates a plurality of vibration frequencies that change continuously when a user is gripping grip section 111 of housing 110, triaxial acceleration sensor 140 detects vibrations generated in housing 110 on an axis-by-axis basis, and outputs these to controller control section 150. Since it is wished to clearly detect changes in vibration of housing 110 vibrated by driving of vibrating motor 120, it is desirable for triaxial acceleration sensor 140 to be installed at a location as far away as possible from vibrating motor 120.

Triaxial angular velocity sensor (gyroscope) 180 is an example of a multiaxial sensor that detects a plurality of vibrations in n-dimensional directions. Here, triaxial angular velocity sensor (gyroscope) 180 detects rotational angular velocity (also referred to as "axial angular velocity") for rotation about three axes—the X-axis, Y-axis, and Z-axis. That is to say, triaxial angular velocity sensor 180 detects turning operations about the X-axis, Y-axis, and Z-axis when vibrating motor 120 generates a plurality of vibration frequencies that change continuously when a user is gripping grip section 111 of housing 110. These detected angular velocities are output to controller control section 150. In the following description, angular velocities (angular velocity sensor outputs) corresponding to the X-axis, Y-axis, and Z-axis detected and output by triaxial angular velocity sensor 180 are called RotX, RotY, and RotZ.

Thus, vibration detection section 170 having triaxial acceleration sensor 140 and triaxial angular velocity sensor 180 detects acceleration in the X-axis, Y-axis, and Z-axis directions, and X-axis, Y-axis, and Z-axis angular velocities, associated with driving of vibrating motor 120 inside housing 110 gripped by a user.

Controller control section 150 controls input/output between various input devices and output devices interconnected by means of a local bus circuit using an IIC (Inter-Integrated Circuit) bus or the like, for example.

In controller control section 150 are mounted electronic parts including various kinds of microchips such as a CPU, a bus controller IC controlling data communication in the local bus circuit, IC memory, and the like, a short-range communication module—communication section 151—that implements radio communication with communication section 21 of the game apparatus body, and so forth. Controller control section 150 generates operation input signals based on signals transmitted from various input devices via the local bus circuit, and transmits a generated operation input signal to game apparatus body 20 via communication section 151.

Specifically, controller control section 150 outputs triaxial acceleration data and triaxial angular velocity data detected by triaxial acceleration sensor 140 and triaxial angular velocity sensor 180 for each vibration frequency of vibrating motor 120 to game apparatus body 20 as user measurement data. Also, controller control section 150 receives a signal transmitted from game apparatus body 20 via communication section 151, generates a control signal, and sends this control signal to an output device associated with the received signal.

A description of processing that generates and sends a signal output in response to an input signal in controller control section 150 is omitted below. Controller control section 150 also outputs to drive circuit section 130 a vibration control signal from vibration control section 252 input via communication sections 21 and 151. Furthermore, controller control section 150 outputs measurement data input from triaxial acceleration sensor 140 and triaxial angular velocity sensor 180 to extraction section 156 of main control section 22 via communication sections 151 and 21.

Vibration control section 252 controls driving of vibrating motor 120, and sweeps the rotational frequency of drive circuit section 130 in a predetermined frequency domain via drive circuit section 130 when a user is gripping housing 110. In other words, vibration control section 252 causes vibrating motor 120 to generate different vibration frequencies sequentially within a predetermined frequency domain. For example, vibration control section 252 gradually greatly changes a voltage supplied to vibrating motor 120 by a fixed proportion by performing step-by-step switching of the magnitude of the voltage supplied to vibrating motor 120.

Here, vibration control section 252 outputs vibration control signals to drive circuit section 130 so as to continuously change the rotational frequency of vibrating motor 120 in successive 10 Hz steps within a frequency range of 0 Hz to 200 Hz. Vibration control signals are generated by sequential reading by vibration control section 252 of successively increasing drive voltage values stored in storage section 253, and are sent to drive circuit section 130 via communication sections 21 and 151.

By this means, six kinds of measurement data can be obtained for three axes for each of 20 different frequencies, and one set of personal data can be made up of 120 (20×6) elements. Thus, personal authentication apparatus 200 according to this embodiment can detect a large amount of information in a short time for each vibration frequency by using triaxial acceleration sensor 140 and triaxial angular velocity sensor 180. Vibrating motor 120 vibration frequency bands subject to vibration detection have been assumed to comprise 20 bands increasing in 10 Hz steps in a frequency range of 0 to 200 Hz, but any number of bands may be used as long as angular velocities on three axes are detected in addition to accelerations on three axes.

It is desirable for the above range of drive voltage values that cause vibrating motor 120 to generate different frequencies (specifically, continuously changing vibration frequencies) to be set so as to include a drive voltage at which a frequency close to or matching the frequency of a user's hand gripping housing 110 is likely to occur when vibrating motor 120 is driven. This is because, when the vibration frequency of vibrating motor 120 and the frequency of a user's hand coincide, it is expected that the amplitude of housing 110 will become larger and acceleration detected by triaxial acceleration sensor 140 will become larger. When detected vibration becomes larger, marked differences arise among individuals, and these can be picked up as characteristics of individuals.

Here, frequencies that vibration control section 252 causes vibrating motor 120 to generate via drive circuit section 130 are set to 0 to 200 Hz as a result of statistics on vibration frequencies most likely to resonate with the frequency of a user's hand when gripping housing 110 for a plurality of users.

Extraction section 156 extracts frequency components indicating each of the measurement data from measurement data (angular velocity data and angular velocity data) detected by triaxial acceleration sensor 140 and triaxial angular velocity sensor 180.

Specifically, extraction section 156 performs spectrum analysis by means of an FFT (Fast Fourier Transform) on data detected by triaxial acceleration sensor 140 and triaxial angular velocity sensor 180 for each stepwise changing vibrating motor 120 vibration frequency. By this means, extraction section 156 extracts frequency components (here, six kinds) from each of the detected data for each stepwise changing vibrating motor 120 vibration frequency. The extracted frequency components are stored in storage section 253 as pre-processing personal data elements. These extracted frequency components may also be output to data processing section 255 as well as being stored in storage section 253.

Storage section 253 stores drive voltage values supplied to vibrating motor 120. In addition, storage section 253 stores a plurality of measurement data (equivalent to "frequency components") detected by triaxial acceleration sensor 140 and triaxial angular velocity sensor 180, and personal data obtained by normalizing these measurement data after they have been processed, associated with each user.

Figure 18:
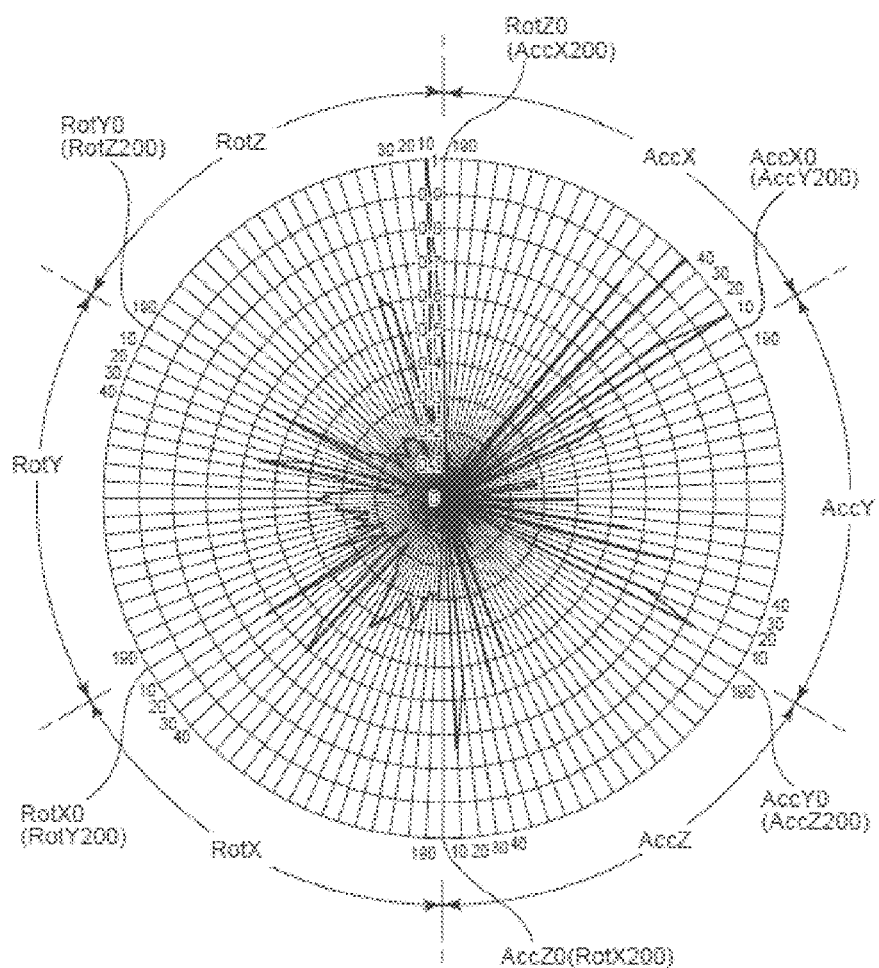
FIG. 18 is a radar chart showing normalized personal data of a user stored in a storage section.

FIG. 18 is a radar chart showing personal data that is normalized measurement data of a user stored in storage section 253.

Personal data is personal data stored in storage section 253 associated with a user, and is composed using a plurality of measurement data for each different vibration frequency of vibrating motor 120 (see FIG. 16) generated when a user is gripping housing 110 (see FIG. 17).

Personal data P1 shown in FIG. 18 forms a radar chart in which frequency components have been normalized after being extracted from acceleration data for the X-axis, Y-axis, and Z-axis directions, and angular velocity data for rotation about the X-axis, Y-axis, and Z-axis, for each of a plurality of vibrating motor 120 vibration frequencies (rotational frequencies).

Personal data P1 is formed using a plurality of measurement data (AccX, AccY, AccZ, RotX, RotY, and RotZ) obtained when vibrating motor 120 (see FIG. 16) is driven and generates vibration frequencies in 10 Hz steps in a frequency range of 0 Hz to 200 Hz.

Specifically, AccX10, AccY10, and AccZ10 in personal data P1 indicate measurement data detected for the X-axis, Y-axis, and Z-axis respectively by triaxial acceleration sensor 140 when the rotational frequency of vibrating motor 120 is 10 Hz.

Also, AccX20, AccY20, and AccZ20 indicate measurement data detected for the X-axis, Y-axis, and Z-axis respectively by triaxial acceleration sensor 140 when the rotational frequency of vibrating motor 120 is 20 Hz.

Similarly, AccX30, 40, . . . AccX200, AccY30, 40, . . . AccY200, and AccZ30, 40, . . . AccZ200 indicate data (acceleration data) detected for the X-axis, Y-axis, and Z-axis respectively by the triaxial acceleration sensor 140 when the rotational frequency of vibrating motor 120 is changed in 10 Hz steps in a frequency range of 30 Hz to 200 Hz. In FIG. 18, AccZ200 is shown at a position overlapping AccY0, AccY200 at a position overlapping AccX0, and AccX200 at a position overlapping RotZ0.

Also, in FIG. 18, RotX10, RotY10, and RotZ10 indicate data detected for the RotX-axis, RotY-axis, and RotZ-axis respectively by triaxial angular velocity sensor 180 when the rotational frequency of vibrating motor 120 is 10 Hz. Furthermore, in FIG. 18, RotX20, RotY20, and RotZ20 indicate data detected for the RotX-axis, RotY-axis, and RotZ-axis respectively by triaxial angular velocity sensor 180 when the rotational frequency of vibrating motor 120 is 20 Hz.

Similarly, RotX30, 40, . . . RotX200, RotY30, 40, . . . RotY200, and RotZ30, 40, . . . RotZ200 indicate data (acceleration data) detected for the RotX-axis, RotY-axis, and RotZ-axis respectively by triaxial acceleration sensor 140 when the rotational frequency of vibrating motor 120 is changed in 10 Hz steps in a frequency range of 30 Hz to 200 Hz (30 Hz, 40 Hz, . . . 200 Hz). In FIG. 18, RotZ200 is shown at a position overlapping RotY0, RotY200 at a position overlapping RotX0, and RotX200 at a position overlapping AccZ0.

Frequency component processing (weighting) and normalization in order to generate personal data are performed by data processing section 255, and the resultant data is stored in storage section 253.

This personal data P1 is generated by performing a processing process on frequency components extracted from measurement data (acceleration data and angular velocity data) for each axis obtained by triaxial acceleration sensor 140 and triaxial angular velocity sensor 180.

To be specific, personal data P1 is generated by having frequency components indicating acceleration in each axial direction and angular velocity about each axis detected for the X-axis, Y-axis, and Z-axis for each of a plurality of vibration frequencies generated by vibrating motor 120 while changing continuously weighted, and then normalized. By this means, personal data composed of weighted frequency components of each axis is all such that characteristics as personal data are manifested.

Figure 19:
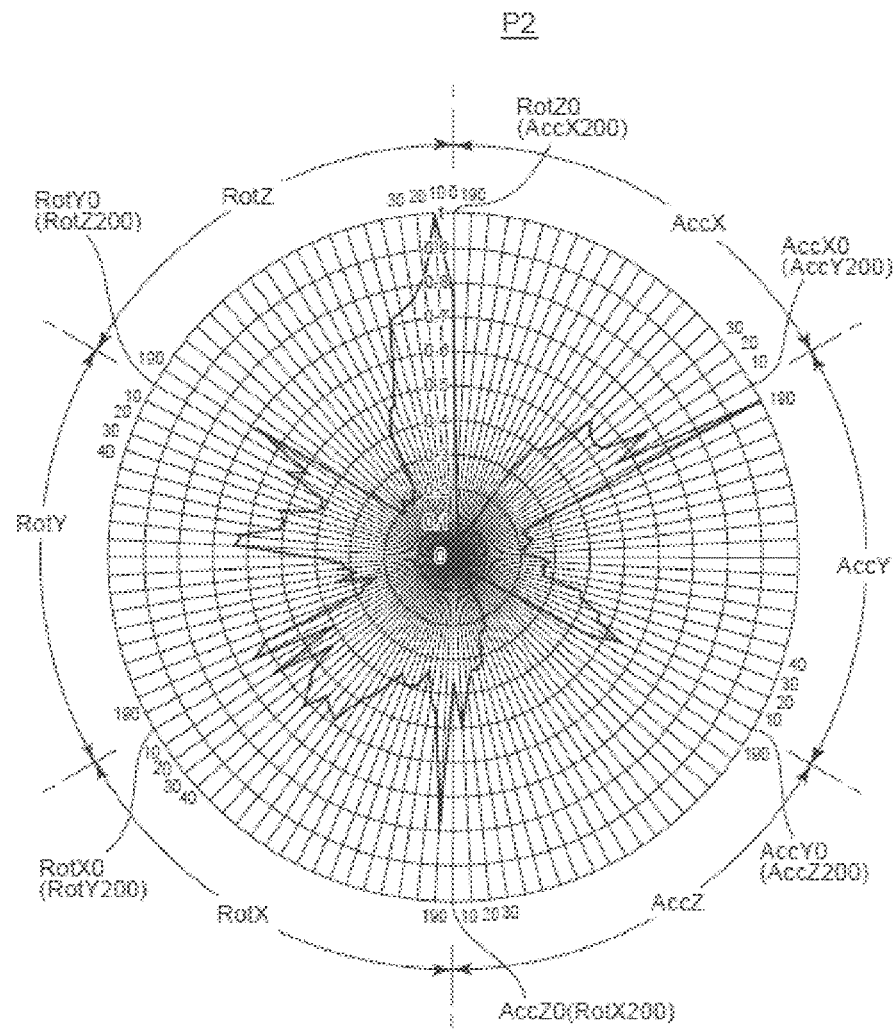
FIG. 19 is a radar chart of pre-processing personal data, which is personal data before being weighted.

FIG. 19 is a radar chart showing personal data P2 prior to being weighted in the personal data shown in FIG. 18. The frequency components shown in FIG. 19 (X-axis, Y-axis, and Z-axis acceleration data indicated by AccX, AccY, AccZ, and so on, and X-axis, Y-axis, and Z-axis rotation data indicated by RotX, RotY, RotZ, and so on) are data extracted as frequency components through analysis by extraction section 156 of signals detected for the X-axis, Y-axis, and Z-axis when the rotational frequency of vibrating motor 120 is swept in a predetermined frequency band, and comprise data prior to weighting and normalization (pre-processing data). That is to say, the program data in FIG. 19 is a group of raw data that is extracted after being detected by one round of measurement and indicates frequency components prior to passing through a weighting filter (prior to being filtered).

As a processing process, data processing section 255 performs weighting using a weighting filter for each frequency component (see FIG. 19) extracted by extraction section 156 for each continuously changing vibration source frequency. That is to say, by performing weighting using a generated weighting filter on the respective frequency components extracted by extraction section 156, data processing section 255 produces characteristic data indicating an individual to which each belongs.

In addition to this, after weighting frequency components extracted by extraction section 156 on a frequency-component-by-frequency-component-basis, data processing section 255 generates the personal data in FIG. 18 by performing normalization and association with a user.

That is to say, after weighting acceleration detection quantities and rotation detection quantities (frequency component values) for each axis that are personal data component elements and are extracted for each vibrating motor 120 vibration frequency, data processing section 255 performs normalization by adjusting the dynamic range for each of the personal data.

That is to say, normalization is performing gain adjustment on weighted frequency components that are personal data elements so that the MAX value of a frequency component having a MAX value becomes the MAX value for another frequency component (here, "1"). In this way, personal data P1 is composed, and can also be called data obtained by normalizing measurement data, and functions as a personal authentication ID.

User personal data composed of elements for which an acceleration detection quantity and rotation detection quantity have been processed (weighted)—that is, frequency components—is associated together with raw data of each frequency component on an individual-by-individual basis as a database, and a plurality thereof are stored on an individual-by-individual basis. Storage section 253 stores measurement data of a plurality of past occasions for each user in a ring buffer.

Here, storage section 253 stores personal data (history data) of five past occasions for each user.

These personal data of a plurality of past occasions stored as history data are personal data of five past occasions arranged in old-to-new order for each of users A, B, . . . X.

With personal data stored in storage section 253, even under the same conditions, characteristics appear on a user-by-user basis according to the relationship between a user's way of gripping housing 110, strength of grip, hand size, and so forth.

Here, personal data is composed of a plurality of frequency components resulting from weighting data acquired via tri-axial acceleration sensor 140 and triaxial angular velocity sensor 180 for each condition—that is, for each continuously changing vibrating motor 120 vibration frequency.

In this embodiment, the number of users whose data is stored in storage section 253 is envisaged as 10, but this is not a limitation, and data for any number of users in excess of one may be stored. Also, personal data—that is, per-user past measurement data—has been assumed to be stored for five past occasions, but personal data may be stored for any number of occasions. It is desirable for storage section 153 to store per-user personal data for at least two occasions.

Determination section 254 performs personal authentication by comparing and collating personal data obtained by causing vibrating motor 120 to vibrate when a user is gripping housing 110 with personal data in storage section 153.

To be specific, determination section 254 compares and collates user measurement data for a user actually gripping 110 detected by triaxial acceleration sensor 140 and triaxial angular velocity sensor 180, and normalized as personal data by data processing section 255, with personal data stored in storage section 253 as history data. Here, the shape (balance of acceleration and angular velocity in each axial direction for each vibrating motor 120 vibration frequency) of a personal data chart (see FIG. 18) is the basis for comparison and collation.

Determination section 254 determines users whose personal data has a higher degree of similarity with normalized user measurement data from among all history data stored in the database in storage section 253 to be correspondingly more likely to be the same person.

Specifically, differences between per-axis values for each vibration frequency generated by vibrating motor 120 in the personal data of a user subject to authentication and corresponding per-axis values for each vibration frequency in stored personal data (history data) are calculated, and the calculated differences are squared to give differential analysis values.

Then the sum of the calculated differential analysis values is calculated. In this way, determination section 254 calculates the sum of differential analysis values of one set of personal data (history data) for all personal data (history data), and compares the sums of differential analysis values of each of the history data. As a result of the comparison, as collation processing, determination section 254 performs ranking of sums of differential analysis values in order of proximity to 0, and determines a user whose personal data (history data) has a high ranking to be the same person as a user subject to authentication.

That is to say, determination section 254 finds differences between all personal data (history data) and measurement data (here, performs subtraction from current measurement data of the user subject to authentication and 120 items of data composing stored personal data), squares each and deletes the +/− sign, and performs ranking in order of proximity to 0, the value to be matched to that value. In the ranking process, if a sum of differential analysis values is large and not close to 0, personal data corresponding to these data are omitted in performing ranking. The 120 items of data mentioned here comprise RotX, RotY, RotZ, AccX, AccY, and AccZ (a total of 6) measured for each of a plurality of frequencies (each frequency increased in 10 Hz steps between 0 and 200 Hz) (a total of 20).

Thus, determination section 254 determines a user for whom the degree of similarity to measurement data of a user subject to authentication is highest among a plurality of history data, which is past measurement data stored on a user-by-user basis, to be the same person.

Here, personal data (history data) and pre-processing personal data are stored in storage section 253. Determination section 254 determines a user corresponding to data with the highest degree of similarity to measurement data among the personal data (history data) to be the same person. Consequently, user authentication is improved.

Thus, in making a determination by comparing personal data that is past history data and functions as a personal ID with measurement data of a user currently being authenticated, determination section 254 does not collate an axis for which a characteristic as a personal difference is most manifested, but performs collation using all measurement data indicating acceleration and angular velocity detected for each corresponding axis.

By means of determination section 154, users determined to be the same person are shown via display 23 in sequential person units as candidates for a user subject to authentication by means of a function of main control section 22. A user subject to authentication can perform confirmation of that authentication by pressing an operating button on game controller 10A, for instance, based on this shown information. Determination section 254 collation processing has been described as performing ranking in order of proximity to 0 of sums of differential analysis values, and determining a user whose history data has a high ranking to be the same person as a user subject to authentication, but the determination method is not limited to this. For example, rankings may be summed on a user-by-user basis, and a user for which that sum is smallest may be determined to be the same person as a user subject to authentication.

The operation of personal authentication apparatus 200 configured in this way will now be described.

Figure 20:
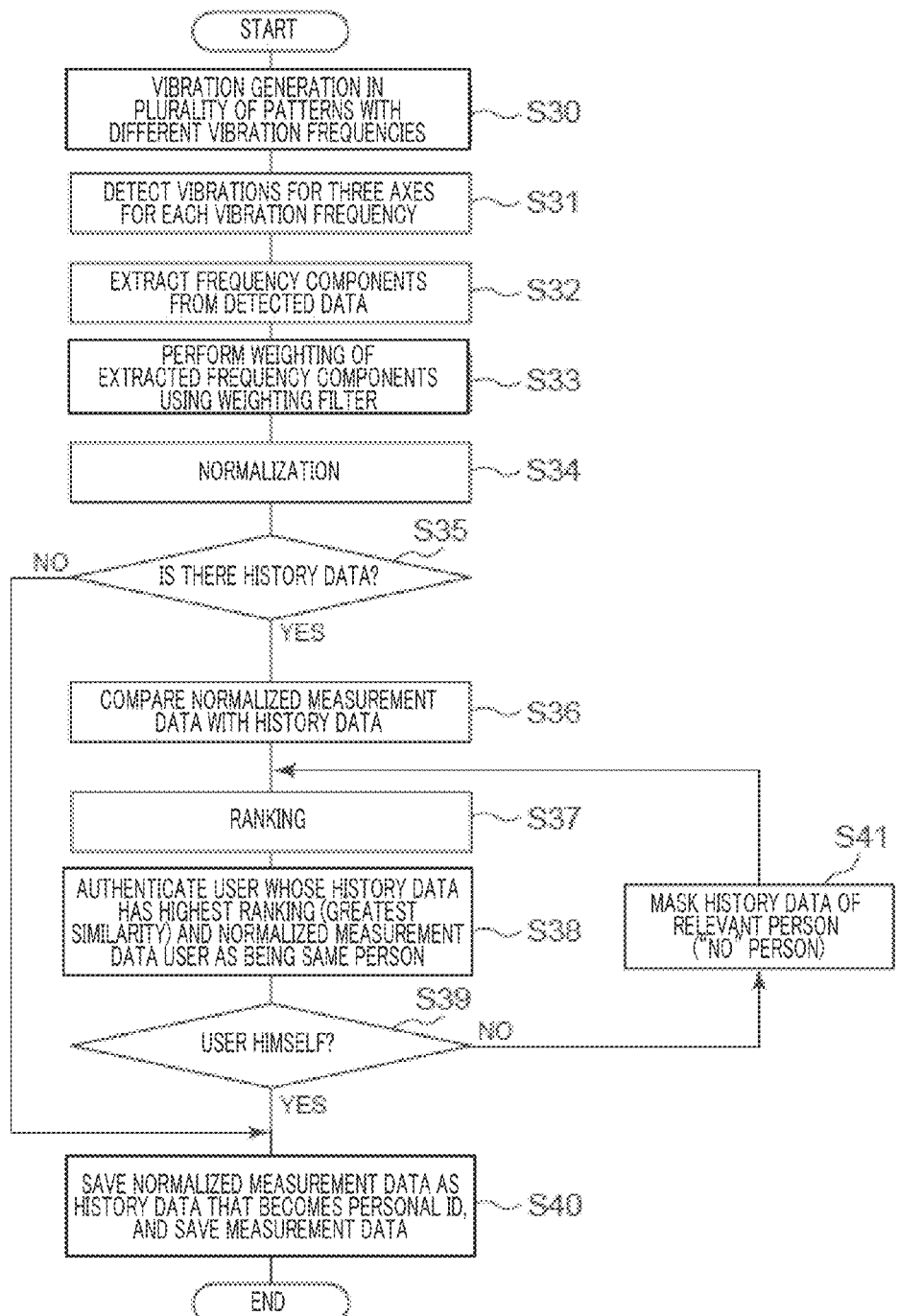
FIG. 20 is a flowchart for explaining authentication processing of a personal authentication apparatus according to Embodiment 2 of the present invention.

FIG. 20 is a flowchart for explaining authentication processing of personal authentication apparatus 200 according to Embodiment 2 of the present invention.

First, a user grips grip section 111 of housing 110 of game controller 10A as shown in FIG. 17, and causes personal authentication apparatus 200 to start authentication processing via game controller 10A. This start of authentication processing may be performed, for example, by pressing an operating button provided on game controller 10A, and transmitting an authentication processing start signal to main control section 22 of game apparatus body 20 via communication sections 151 and 21, or by operating game apparatus body 20 itself.

When authentication processing is started, in step S30 vibration control section 252 reads a drive voltage value stored in storage section 253, and transmits this to game controller 10A via communication section 21. A drive control signal from vibration control section 252 is input to drive circuit section 130 via communication section 151, and drives vibrating motor 120, causing it to vibrate.

By this means, vibrating motor 120 generates continuously changing vibration frequencies. Here, vibration control section 252 generates continuously changing vibration frequencies so as to increase in 10 Hz steps between 0 Hz and 200 Hz.

In step S31, triaxial acceleration sensor 140 and triaxial angular velocity sensor 180 detect vibrations when a user is gripping grip section 111 of housing 110, and output these to main control section 22 via communication section 151. Specifically, in step S31, triaxial acceleration sensor 140 detects X-axis, Y-axis, and Z-axis accelerations for each vibration frequency (here, for each frequency generated by vibrating motor 120 due to a difference of drive voltage), and outputs these to main control section 22 as measurement data. At this time, triaxial angular velocity sensor 180 detects angular velocities about the X-axis, Y-axis, and Z-axis for each vibration frequency (here, for each frequency generated by vibrating motor 120 due to a difference of drive voltage), and outputs these to main control section 22 as measurement data.

In step S32, main control section 22 extracts frequency components from measurement data (acceleration data and angular velocity data) detected by triaxial acceleration sensor 140 and triaxial angular velocity sensor 180.

Specifically, in step S32, extraction section 156 of main control section 22 performs FFT analysis of measurement data input from triaxial acceleration sensor 140 and triaxial angular velocity sensor 180, and extracts the frequency components.

In step S33, main control section 22 performs weighting of the extracted frequency components using a weighting filter.

To be specific, in step S33, data processing section 255 of main control section 22 generates a weighting filter for weighting the detected X-axis acceleration, Y-axis acceleration, Z-axis acceleration, X-axis angular velocity, Y-axis angular velocity, and Z-axis angular velocity data, and weights each of these data. By this means, user individual differences more readily appear in detection data from triaxial acceleration sensor 140. Details of weighting filter generation in step S33 will be given later herein.

In step S34, data processing section 255 performs normalization by performing gain adjustment, for each of the personal data, of all data composing measurement data (acceleration data of each axis indicating vibration on each axis for each drive voltage) for user measurement data detected for each vibration frequency increasing in 10 Hz steps in a range of 0 to 200 Hz so that the MAX value becomes the MAX value of user measurement data. Here, the dynamic range is adjusted for each of the measurement data obtained in one round of user measurement—that is, gain adjustment is performed so that the MAX value of data in the measurement data becomes a predetermined value (here, 1).

That is to say, in step S34, as shown in personal data P1 (see FIG. 18), data processing section 255 performs normalization by making a frequency component indicating a MAX value "1" and performing adjustment with other frequency components as appropriate among frequency components detected at 10 Hz intervals in a range of 10 Hz to 200 Hz, according to AccX, AccY, AccZ, RotX, RotY, and RotZ composing personal data P1.

In step S35, determination section 254 checks whether there is history data (personal data) in storage section 253, and proceeds to step S36 if history data is stored in storage section 253, or proceeds to step S40 if there is no history data in storage section 253.

In step S36, determination section 254 compares normalized measurement data with history data. Determination section 254 processing in this step S36 is the comparison processing in the above-mentioned comparison and collation processing.

In step S37, determination section 254 compares normalized measurement data with all history data, performs ranking of all history data in descending order of similarity to normalized measurement data, and proceeds to step S38. Determination section 254 processing in this step S37 is the collation processing in the above-mentioned comparison and collation processing.

In step S38, determination section 254 authenticates a user with the highest ranking—that is, whose personal data has the greatest similarity—among ranked history data (personal data) comprising personal IDs, and a normalized measurement data user, as being the same person, and proceeds to step S39.

In step S39, determination section 254 indicates to the normalized measurement data user whether or not the user is the authenticated history data user himself (the relevant person), and proceeds to step S40 if the user himself, or proceeds to step S41 if not the user himself.

In step S40, determination section 254 takes a group of normalized measurement data as personal data that is a user's personal ID, and stores this personal data in storage section 253 as history data. In addition, in step S40, determination section 254 saves pre-normalization unfiltered measurement data (frequency components that have not passed through a weighting filter) in storage section 253, associated with a normalized measurement data user, and terminates the processing.

In step S41, history data (personal data) authenticated as for the same person according to the rankings is masked, and the processing flow proceeds to step S37. Specifically, in step S41, determination section 254 masks all user history data of history data authenticated as for the same person according to the rankings. In step S37, determination section 254 again performs ranking of all history data, excluding masked history data, in descending order of similarity to normalized measurement data, and repeats the subsequent processing.

Thus, with a game apparatus provided with personal authentication apparatus 200, game apparatus body 20 performs identification of an individual using game controller 10A, and switching to a setting and function corresponding to that individual can be performed on the game apparatus body 20 side.

Next, generation of a weighting filter used when performing weighting in step S33 will be described.

Figure 21:
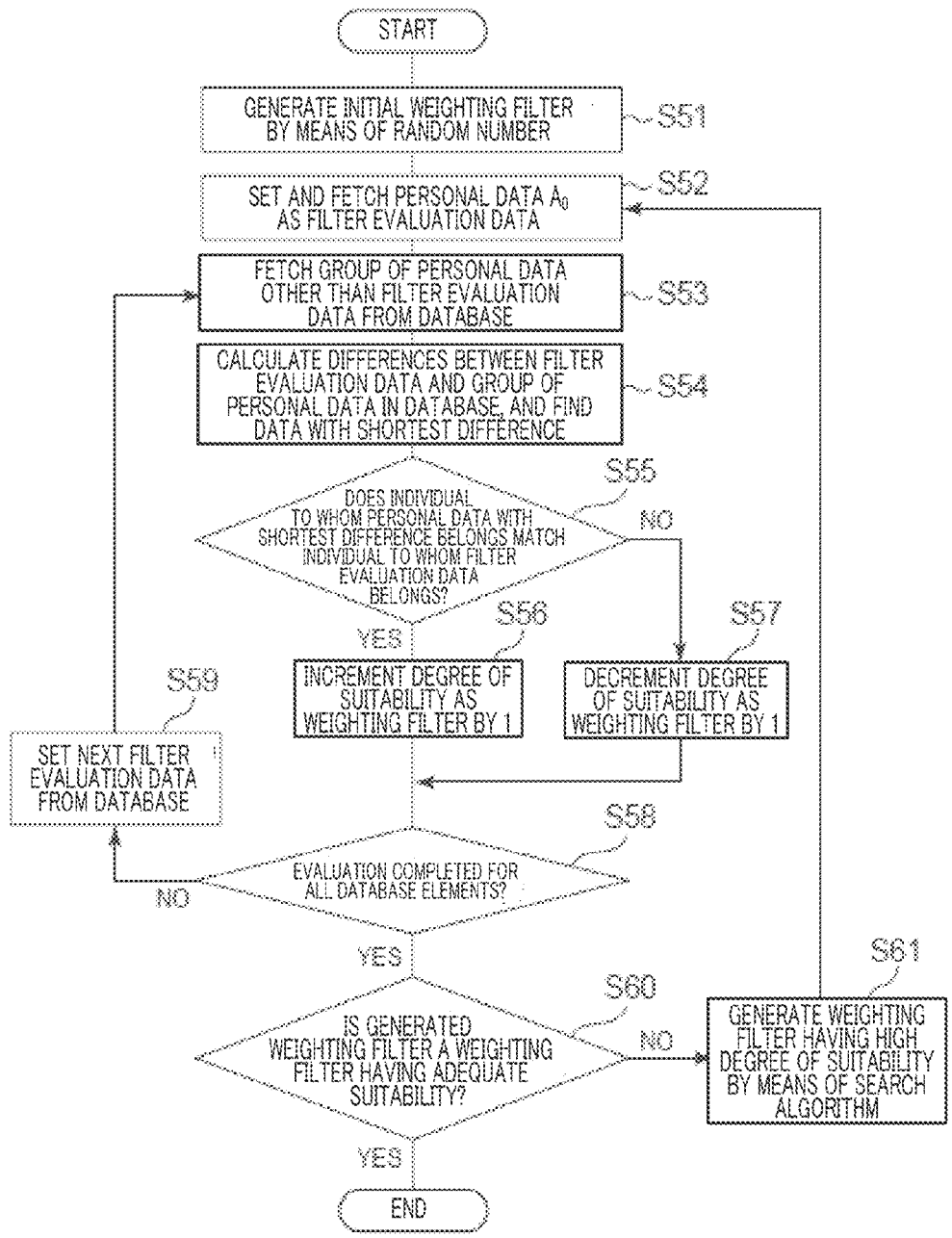
FIG. 21 is a flowchart explaining a weighting filter generation method in a personal authentication apparatus according to Embodiment 2 of the present invention.

FIG. 21 is a flowchart explaining a weighting filter generation method in a personal authentication apparatus according to Embodiment 2 of the present invention.

Here, storage section 253 is assumed to store personal data for persons A, B, . . . , X, and there is a plurality of personal data for each individual (Database={$A_0, A_1, A_2, A_3, \ldots A_n, B_0, B_1, \ldots X_{m-1}, X_m$}. That is to say, storage section 253 functions as a personal data database. These pluralities of personal data $A_0, A_1, A_2, A_3, \ldots A_n, B_0, B_1, \ldots X_{m-1}, X_m$ associated with individuals A, B, . . . , X are here pre-weighting-filtering personal data that have not passed through a weighting filter—that is, pre-processing personal data (raw data).

FIG. 22 is a drawing showing pre-processing personal data (raw personal data) "Personal" in text. Such raw personal data is stored in storage section 253 as a database together with personal data (personal data after processing and normalization) associated with a predetermined individual.

As shown in FIG. 22, in the database in storage section 253, personal data $A_0, A_1, A_2, A_3, \ldots A_n, B_0, B_1, \ldots X_{m-1}, X_m$ each have the form {$AccX_{0-10\,Hz}, AccX_{10-20\,Hz}, \ldots AccX_{190-200\,Hz}, AccY_{0-10\,Hz}, \ldots, AccY_{190-200\,Hz}, AccZ_{0-10\,Hz}, \ldots, AccZ_{190-200\,Hz}, RotX_{0-10\,Hz}, RotX_{10-20\,Hz}, \ldots, RotX_{190-200\,Hz}, RotY_{0-10\,Hz}, \ldots, RotY_{190-200\,Hz}, RotZ_{0-10\,Hz}, \ldots, RotZ_{190-200\,Hz}$} as personal data (Personal), AccX, AccY, and AccZ are triaxial (X, Y, Z) acceleration sensor outputs, and RotX, RotY, and RotZ are triaxial (X, Y, Z) angular velocity sensor outputs.

In step S51, data processing section 255 of main control section 22 generates an initial weighting filter using a random number.

FIG. 23 is a drawing provided to explain a weighting filter (Weight), and shows an example of a weighting filter. As shown in FIG. 23, weighting filter (Weight) has the form Weight={$Weight_{0-10\,Hz}, Weight_{10-20\,Hz}, \ldots, Weight_{190-200\,Hz}$}. Weight (Weight) is set for each of the measurement data composing raw personal data, and satisfies the condition $0 \leq Weight \leq 1.0$.

In step S52, data processing section 255 sets and fetches (reads) from the personal data database in storage section 253 personal data (for example, personal data A0) as filter evaluation data for evaluating a generated weighting filter.

In step S53, data processing section 255 fetches a group of personal data other than the personal data (personal data A0) set as filter evaluation data (that is, personal data $A_0, A_1, A_2, A_3, \ldots A_n, B_0, B_1, \ldots X_{m-1}, X_m$) from storage section 253 (the database).

In step S54, differences between the filter evaluation data (personal data $A_0$) and personal data other than the personal data set as filter evaluation data—that is, the group of personal data in the database in storage section 253—are calculated, and personal data with the shortest (smallest) difference in the group of personal data is found.

This difference is shown in FIG. 24. FIG. 24 is a drawing provided to explain a personal data difference.

As shown in FIG. 24, a personal data difference (Diff) is taken as an absolute value of a value obtained by weighting differences between the filter evaluation data (personal data $A_0$) and personal data in the group of personal data ($A_0, A_1, A_2, A_3, \ldots A_n, B_0, B_1, \ldots X_{m-1}, X_m$) other than the filter evaluation data (personal data $A_0$) by means of an initial weighting filter (Weight). This personal data difference (Diff=|(PersonalA−PersonalB)·Weight|) is calculated using a square difference of each element (measurement data) of personal data $A_0$ and each element (measurement data) of each of the personal data other than personal data $A_0$ detected for each vibration frequency, and initial weighting filter (Weight) weighting for each vibration frequency.

That is to say, Diff=|(Personal.A−Personal.B)·Weight|= $(PersonalA.AccX_{0-10\,Hz} - PersonalB.AccX_{0-10\,Hz})^2 \cdot Weight_{0-10\,Hz} + (PersonalA.AccX_{10-20\,Hz} - PersonalB.AccX_{10-20\,Hz})^2 \cdot Weight_{10-20\,Hz} + \ldots + (PersonalA.AccX_{190-200\,Hz} - PersonalB.AccX_{190-200\,Hz})^2 \cdot Weight_{190-200\,Hz} + (PersonalA.AccY_{0-10\,Hz} - PersonalB.AccY_{0-10\,Hz})^2 \cdot Weight_{0-10\,Hz} + \ldots + (PersonalA.AccZ_{0-10\,Hz} - PersonalB.AccZ_{0-10\,Hz})^2 \cdot Weight_{0-10\,Hz} + \ldots + (PersonalA.RotY_{0-10\,Hz} - PersonalB.RotY_{0-10\,Hz})^2 \cdot Weight_{0-10\,Hz} + \ldots + (PersonalA.RotZ_{190-200\,Hz} - PersonalB.RotZ_{190-200\,Hz})^2 \cdot Weight_{190-200\,Hz}$.

Thus, in step S54, data processing section 255 calculates corresponding Diff's using filter evaluation data ($A_0$) and each of the personal data of the group of personal data ($A_1, A_2, A_3, \ldots A_n, B_0, B_1, \ldots X_{m-1}, X_m$) other than the filter evaluation data. Data processing section 255 compares the calculated Diff's, and determines the personal data for which the difference is shortest as a result of this comparison.

In step S55, data processing section 255 uses the above Diff to determine whether or not the individual to whom the personal data for which the difference is shortest belongs and the individual to whom the filter evaluation data belongs match. If the individual to whom the personal data for which the difference is shortest belongs and the individual to whom the filter evaluation data belongs match in step S55, the processing flow proceeds to step S56, whereas if they do not match, the processing flow proceeds to step S57.

In step S56, data processing section 255 increments the degree of suitability as a weighting filter by 1 (increases the evaluation value as a weighting filter) for the weighting filter used in filter evaluation, and proceeds to step S58.

On the other hand, in step S57, data processing section 255 decrements the degree of suitability as a weighting filter by 1 (decreases the evaluation value as a weighting filter) for the weighting filter used in filter evaluation, and proceeds to step S58.

In step S58, data processing section 255 uses the generated weighting filter and set filter evaluation data together with a group of personal data other than this to determine whether or not evaluation has been completed for all database elements. That is to say, in step S58, it is determined whether or not weighting filter evaluation has been performed by setting all personal data (history data) in the database as filter evaluation data, and calculating a difference from all groups of personal data other than set filter evaluation data.

If it is determined in step S58 that evaluation has not been performed for all database elements, the processing flow proceeds to step S59, the next filter evaluation data is set from the database, the processing flow returns to step S53, and the processing is repeated.

On the other hand, if it is determined in step S58 that evaluation of generated weighting filter suitability has been completed for all database elements, the processing flow proceeds to step S60.

In step S60, based on the degree of filter suitability, data processing section 255 determines whether or not the generated weighting filter is a weighting filter having adequate suitability. If it is determined in step S60 that the generated weighting filter is a filter having adequate suitability, weighting filter generation processing is terminated, whereas if it is determined that the generated weighting filter is not a filter having adequate suitability, the processing flow proceeds to step S61.

In step S61, a filter is generated by means of a search algorithm, the processing flow proceeds to step S52, and the processing is repeated until a filter with a higher degree of filter suitability is generated in step S61.

In this way, data processing section 255 generates a weighting filter with a high degree of suitability. Using this generated weighting filter, data processing section 255 performs weighting for each of the personal data (to be specific, for each of the measurement data of each of the personal data), for frequency components that are extracted measurement data (acceleration data and angular velocity data).

According to this embodiment, a user performs personal authentication simply by taking up a posture using game controller 10A—that is, by gripping game controller 10A, causing vibrating motor 120 to generate a vibration frequency that increases by a fixed proportion, and having vibration detected by vibration detection section 170. That is to say, a user can perform personal authentication simply by gripping game controller 10A, and personal settings, personal data, and so forth can be freely selected without the user being made aware, enabling operational feeling to be improved.

Also, personal authentication can be performed easily without a user being requested to perform a key operation, or move game controller 10A itself in a predetermined direction.

Furthermore, in recent years, many devices such as game controller 10A have become known that are provided with a vibrator (vibrating motor) for providing a user with an operational feeling, and an acceleration sensor (and in particular, a triaxial acceleration sensor) in order to detect acceleration applied to a device such as game controller 10A, and recognize this as part of an operation, as an operation (manipulation) input method in games and applications.

Using a game controller provided with these functions beforehand, personal authentication can be formed easily using only both the vibrator and acceleration sensor functions, and without detriment to either the vibrator or acceleration sensor function.

According to personal authentication apparatus 200 of this embodiment, sensors used when performing personal authentication with the device are smaller and less expensive than in the case of authentication technologies such as fingerprint pattern authentication using a conventional optical sensor, biometric authentication in which vein pattern authentication is performed using infrared light, or authentication by means of image analysis in which an iris pattern, or a pattern of capillaries in the face or retina of the eye, is captured as an image by a camera using an optical sensor. Furthermore, since personal authentication is improved by utilizing vibration of a vibrating motor, additional devices and component parts can be kept to a minimum.

Thus, personal authentication apparatus 200 of this embodiment enables personal authentication to be performed easily by a device provided with a vibrating motor (vibrator) and multiaxial sensors (an acceleration sensor and an angular velocity sensor).

In this embodiment, personal authentication apparatus 200 has been assumed to have a configuration applied to game controller 10A and game apparatus body 20, but the configuration is not limited to this, and personal authentication apparatus 200 may also be installed in game controller 10A itself or in a portable electronic device. That is to say, with regard to the configuration requirements of personal authentication apparatus 200, as long as vibrating motor 120 and at least one or other of triaxial acceleration sensor 140 and/or triaxial angular velocity sensor 180 detecting vibration is installed inside the housing of a device, other configuration requirements may be provided for anywhere and in any way.

Specifically, a configuration may be used whereby game controller 10A is an electronic device, and main control section 22 side vibration control section 252, storage section 253, determination section 254, and data processing section 255 are installed inside this electronic device together with vibrating motor 120, triaxial acceleration sensor 140, and triaxial angular velocity sensor 180. When using such a configuration, a configuration is desirable such that the electronic device itself is provided with a display section showing authentication, and determination section 254 determination results can be displayed.

In the authentication processing of Embodiment 2 described using the flowchart in FIG. 20, after step S41 the processing flow proceeds to step S37, and determination section 254 again performs ranking of all history data, excluding masked history data (personal data stored in storage section 253), in descending order of similarity to normalized measurement data, but processing may also be used in which the processing flow proceeds to step S38 after step S41. In this case, in step S38 determination section 254 performs collation processing again using all history data already ranked in the previous processing. Specifically, determination section 254 authenticates a user with the highest ranking (smallest ranking number) among all users whose history data has already been ranked in the previous processing, excluding users with masked history data, as the same person as a normalized measurement data user.

Thus, according to a personal authentication apparatus of this embodiment, by performing weighting on frequency components for three axes extracted when vibrating motor 120, which is a vibration source, is caused to generate vibration that changes step-by-step, an optimal authentication coefficient in a database already registered in storage section 253 can always be extracted.

Consequently, a database that is ideal from the standpoint of performing personal authentication can be constructed. Also, even if an optimal frequency band for improving the authentication rate differs, due to disturbances such as a powerful radio wave, abnormal power supply voltage, noise exceeding input tolerance, an electrical discharge caused by static electricity, or the like, the situation can be coped with satisfactorily without performing normalization at the disturbance level.

Provision may also be made for data processing section 255 in personal authentication apparatus 200 of the above embodiment to switch weighting processing and perform processing that extracts a characteristic frequency component—that is, a peak frequency component value—for each frequency component as a processing process.

For example, data processing section 255 of personal authentication apparatus 200 may set a window frequency range in the vicinity of the peak value of each frequency component extracted by means of FFT analysis. By this means, only a frequency component peak within the window is extracted, and other redundant information is excluded. The predetermined width of the window set here is made a bandwidth allowing extraction of two or more frequency spectra, with a width of 200 Hz being set, for example. By this means, even if there is peak spectrum deviation in frequency components extracted from measurement data (acceleration data and angular velocity data) detected on an individual-by-individual basis, detection is still possible within the predetermined range, the amount of information increases, and an improvement in the authentication rate can be achieved.

A case has here been described by way of example in which the present invention is configured as hardware, but it is also possible for the present invention to be implemented by software. For example, a program can be used that is stored in memory of a computer capable of communicating with a game controller in which vibrating motor 120, triaxial acceleration sensor 140, triaxial angular velocity sensor 180, and communication section 151 are installed inside housing 110, and is executed by a control section of the computer. This program has an algorithm, written in a programming language, that causes the computer to function as vibration control section 252 that vibrates vibrating motor 120 and sweeps in a predetermined frequency domain when a user is gripping the housing, an extraction section that extracts frequency components from a plurality of measurement data obtained by detection by triaxial acceleration sensor 140 and triaxial angular velocity sensor 180 of each of a plurality of vibration frequencies generated in a continuously changing fashion by vibrating motor 120, storage section 253 that stores extracted frequency components for each user, and a determination section that performs personal authentication by comparing and collating measurement data obtained by causing vibrating motor 120 to vibrate when a user is gripping housing 110 with data in storage section 253. The same kind of functions as those of a personal authentication apparatus according to the present invention can be implemented by storing this program in the memory of the computer and having it executed by the control section.

The present invention is not limited to the above-described embodiments, and various variations and modifications may be possible without departing from the scope of the present invention The disclosures of Japanese Patent Application No. 2009-106826, filed on Apr. 24, 2009, and Japanese Patent Application No. 2010-94135, filed on Apr. 15, 2010, including the specifications, drawings and abstracts, are incorporated herein by reference in their entirety.

INDUSTRIAL APPLICABILITY

A personal authentication apparatus according to the present invention has an effect of enabling personal authentication of a user to be performed easily, and is suitable for use in a game apparatus provided with a game controller.

REFERENCE SIGNS LIST

10 GAME CONTROLLER
20 GAME APPARATUS BODY
22 MAIN CONTROL SECTION
100, 200 PERSONAL AUTHENTICATION APPARATUS
110 HOUSING
111 GRIP SECTION
120 VIBRATING MOTOR
130 DRIVE CIRCUIT SECTION
140 TRIAXIAL ACCELERATION SENSOR
152 VIBRATION CONTROL SECTION
153 STORAGE SECTION
154 DETERMINATION SECTION
155 DATA ADJUSTMENT SECTION
156 EXTRACTION SECTION
170 VIBRATION DETECTION SECTION
180 TRIAXIAL ANGULAR VELOCITY SENSOR
252 VIBRATION CONTROL SECTION
253 STORAGE SECTION
254 DETERMINATION SECTION
255 DATA PROCESSING SECTION

The invention claimed is:

1. A personal authentication apparatus comprising:
a vibration source provided inside a housing;
a vibration control section that causes said vibration source to vibrate in a plurality of different patterns when a user is gripping said housing;
a multiaxial sensor that detects a plurality of vibrations in n-dimensional directions;
a storage section that stores, on a user-by-user basis, a plurality of measurement data obtained by detection by said multiaxial sensor of vibration generated by a vibration source that vibrates in a different pattern; and
a determination section that performs personal biometric authentication by comparing and collating measurement data obtained by causing said vibration source to vibrate according to the plurality of different patterns when a user is gripping said housing with data of said storage section.

2. The personal authentication apparatus according to claim 1, wherein said vibration control section causes said vibration source to vibrate in the plurality of different patterns by switching a voltage supplied to said vibration source.

3. The personal authentication apparatus according to claim 1, wherein said multiaxial sensor is a triaxial sensor, and amplifies a value of data detected for an axis for which a detected amount of vibration is small at a time of data acquisition or at a time of measurement.

4. The personal authentication apparatus according to claim 1, wherein:
said storage section stores a plurality of history data of past measurement data; and
said determination section determines that a user for which data has the highest degree of similarity with measurement data among all said history data is a same person.

5. The personal authentication apparatus according to claim 4, wherein:
said storage section stores said history data and average-value data obtained from said history data; and
said determination section determines that a user corresponding to data that has the highest degree of similarity with measurement data among said history data and said average-value data is a same person.

6. A personal authentication apparatus comprising:
a vibration source provided inside a housing of a game controller;
a vibration control section that causes said vibration source to vibrate in a plurality of different patterns when a user is gripping said housing;
a triaxial acceleration sensor that detects a plurality of vibrations in 3-dimensional directions;
a storage section that stores, on a user-by-user basis, history data of a plurality of occasions of a plurality of measurement data obtained by detection by said triaxial acceleration sensor of vibration generated by said vibration source that vibrates at a different voltage; and
a determination section that performs personal biometric authentication by comparing and collating measurement data obtained by causing said vibration source to vibrate according to the plurality of different patterns when a user is gripping said housing with data of said storage section,
wherein said determination section determines a user for which history data has the highest degree of similarity with measurement data among all said history data to be a candidate for being a same person.

7. The personal authentication apparatus according to claim 6, wherein candidate users biometrically determined to be candidates for a single user by said determination section are displayed sequentially.

8. A personal authentication apparatus comprising:
a vibration source provided inside a housing;
a vibration control section that causes said vibration source to vibrate and continuously changes a frequency of that vibration source when a user is gripping said housing;
a multiaxial vibration detection section that detects vibration by said vibration source;
an extraction section that extracts respective frequency components from a plurality of measurement data obtained by detection by said multiaxial vibration detection section for each frequency of said vibration source that changes continuously;
a processing section that performs processing and output for each said frequency component;
a storage section that stores processed said frequency components on a user-by-user basis; and
a determination section that performs personal authentication by comparing and collating a frequency component extracted from measurement data obtained by causing said vibration source to vibrate when a user is gripping said housing with a frequency component stored in said storage section.

9. The personal authentication apparatus according to claim 8, wherein said multiaxial vibration detection section comprises:
a triaxial acceleration sensor that detects acceleration in three axial directions; and
a gyrosensor that detects rotation about each axis of said triaxial acceleration sensor.

10. The personal authentication apparatus according to claim 8, wherein said processing section performs weighting for each frequency component.

11. The personal authentication apparatus according to claim 8, wherein said processing section extracts a peak value of said frequency components.

12. The personal authentication apparatus according to claim 8, wherein:
said storage section stores a plurality of personal data with processed said frequency components associated with each user; and
said determination section determines that a user with data that has the highest degree of similarity with a frequency component among all of stored said personal data is a same person.

13. A personal authentication apparatus comprising:
a vibration source provided inside a housing of a game controller;
a vibration control section that causes said vibration source to vibrate and continuously changes a frequency of that vibration source when a user is gripping said housing;
a multiaxial vibration detection section that detects vibration by said vibration source;
an extraction section that extracts respective frequency components from a plurality of measurement data obtained by detection by said multiaxial vibration detection section for each frequency of said vibration source that changes continuously;
a processing section that performs processing and output for each said frequency component;
a storage section that stores processed said frequency components on a user-by-user basis; and
a determination section that performs personal authentication by comparing and collating a frequency component extracted from measurement data obtained by causing said vibration source to vibrate when a user is gripping said housing with a frequency component stored in said storage section,
wherein said determination section determines a user associated with a frequency component having the highest degree of similarity with a current frequency component among all said frequency components to be a candidate for being a same person.

14. The personal authentication apparatus according to claim 13, wherein candidate users biometrically determined to be candidates for a single user by said determination section are displayed sequentially.

15. A program that causes a computer enabling communication with a game controller in which a vibration source and a triaxial acceleration sensor that detects a plurality of vibrations in 3-dimensional directions and a communication section are installed inside a housing to function as:
a vibration control section that causes said vibration source to vibrate in a plurality of different patterns when a user is gripping said housing;
a storage section that stores, on a user-by-user basis, a plurality of measurement data obtained by detection by said triaxial acceleration sensor of vibration generated by a vibration source that vibrates in a different pattern; and
a determination section that performs personal biometric authentication by comparing and collating measurement data obtained by causing said vibration source to vibrate according to the plurality of different patterns when a user is gripping said housing with data of said storage section.

* * * * *